United States Patent
O'Connell et al.

(10) Patent No.: US 10,336,205 B2
(45) Date of Patent: *Jul. 2, 2019

(54) SYSTEM AND METHOD OF CHARGING A VEHICLE USING A DYNAMIC POWER GRID, AND SYSTEM AND METHOD OF MANAGING POWER CONSUMPTION IN THE VEHICLE

(71) Applicant: International Business Machines Corporation, Armonk, NY (US)

(72) Inventors: Brian Marshall O'Connell, Research Triangle Park, NC (US); Rick Allen Hamilton, Charlottesville, VA (US); James Robert Kozloski, New Fairfield, CT (US); Clifford Alan Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

This patent is subject to a terminal disclaimer.

(21) Appl. No.: 15/151,222

(22) Filed: May 10, 2016

(65) Prior Publication Data

US 2016/0250941 A1 Sep. 1, 2016

Related U.S. Application Data

(63) Continuation of application No. 13/365,834, filed on Feb. 3, 2012, now Pat. No. 9,379,559.

(51) Int. Cl.
*B60L 11/18* (2006.01)
*H02J 7/00* (2006.01)
(Continued)

(52) U.S. Cl.
CPC .............. *B60L 11/1844* (2013.01); *B60L 1/02* (2013.01); *B60L 1/14* (2013.01); *B60L 53/30* (2019.02);
(Continued)

(58) Field of Classification Search
CPC .............. B60L 11/1844; B60L 11/1846; B60L 11/1842; B60L 1/02; B60L 1/14;
(Continued)

(56) References Cited

U.S. PATENT DOCUMENTS

| 6,673,479 B2 | 1/2004 | McArthur et al. |
| 7,013,205 B1 | 3/2006 | Hafner et al. |

(Continued)

FOREIGN PATENT DOCUMENTS

| CN | 1635962 A | 7/2005 |
| DE | 10 2008 037 576 A1 | 6/2010 |

(Continued)

OTHER PUBLICATIONS

W. Kempton et al., "Vehicle to grid power fundamentals: Calculating capacity and net revenue," J. Power Sources, vol. 144, Issue 1, Jun. 2005, pp. 268-279.

(Continued)

*Primary Examiner* — Alan D Hutchinson
(74) *Attorney, Agent, or Firm* — Vazken Alexanian; McGinn IP Law Group, PLLC

(57) ABSTRACT

A system for charging a vehicle, includes a processing device which is communicatively coupled to a plurality of vehicles and maintains a forward model for modeling vehicle charging data for the plurality of vehicles, and a computing device which, based on the forward model, maintains a charge exchange market which directs a formation of a flash charge mob of vehicles from the plurality of vehicles at an optimal location to exchange charge.

19 Claims, 13 Drawing Sheets

(51) Int. Cl.

| | | |
|---|---|---|
| *B60L 1/02* | (2006.01) | |
| *B60L 1/14* | (2006.01) | |
| *G06Q 30/08* | (2012.01) | |
| *G06Q 40/04* | (2012.01) | |
| *H02J 3/00* | (2006.01) | |
| *H02J 13/00* | (2006.01) | |
| *G01C 21/34* | (2006.01) | |
| *B60L 53/30* | (2019.01) | |
| *B60L 55/00* | (2019.01) | |
| *B60L 53/63* | (2019.01) | |
| *B60L 53/65* | (2019.01) | |
| *B60L 53/66* | (2019.01) | |
| *B60L 58/12* | (2019.01) | |
| *B60L 53/51* | (2019.01) | |
| *B60L 53/52* | (2019.01) | |
| *B60L 53/68* | (2019.01) | |

(52) U.S. Cl.
CPC ............ *B60L 53/305* (2019.02); *B60L 53/51* (2019.02); *B60L 53/52* (2019.02); *B60L 53/63* (2019.02); *B60L 53/65* (2019.02); *B60L 53/665* (2019.02); *B60L 53/68* (2019.02); *B60L 55/00* (2019.02); *B60L 58/12* (2019.02); *G01C 21/3469* (2013.01); *G06Q 30/08* (2013.01); *G06Q 40/04* (2013.01); *H02J 3/008* (2013.01); *H02J 7/0027* (2013.01); *H02J 7/0054* (2013.01); *H02J 13/0013* (2013.01); *B60L 2240/12* (2013.01); *B60L 2240/34* (2013.01); *B60L 2240/622* (2013.01); *B60L 2240/662* (2013.01); *B60L 2240/667* (2013.01); *B60L 2240/68* (2013.01); *B60L 2240/70* (2013.01); *B60L 2240/72* (2013.01); *B60L 2240/80* (2013.01); *B60L 2250/12* (2013.01); *B60L 2250/14* (2013.01); *B60L 2250/16* (2013.01); *B60L 2260/52* (2013.01); *B60L 2260/54* (2013.01); *B60L 2270/12* (2013.01); *H02J 2003/007* (2013.01); *H02J 2007/0067* (2013.01); *H02J 2007/0096* (2013.01); *Y02B 70/3216* (2013.01); *Y02B 90/2607* (2013.01); *Y02E 60/721* (2013.01); *Y02E 60/76* (2013.01); *Y02T 10/7005* (2013.01); *Y02T 10/705* (2013.01); *Y02T 10/7044* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 10/126* (2013.01); *Y04S 10/58* (2013.01); *Y04S 20/221* (2013.01); *Y04S 30/14* (2013.01); *Y04S 40/12* (2013.01); *Y04S 40/22* (2013.01); *Y04S 50/10* (2013.01)

(58) Field of Classification Search
CPC ............ B60L 11/1824; B60L 11/1848; B60L 11/1861; B60L 2240/72; B60L 2240/70; B60L 2270/12; B60L 2240/667; B60L 2240/622; B60L 2240/32; B60L 2240/12; B60L 2230/40; B60L 2230/24; B60L 2230/22; B60L 2230/16; B60L 2260/54; B60L 2260/52; B60L 2250/16; B60L 2250/14; B60L 2250/12; B60L 2240/80; B60L 2240/68; B60L 2240/662; B60L 2240/34; G01C 21/3469; G06Q 30/08; G06Q 40/04; Y02B 70/3216; Y02B 90/2607; Y04S 40/12; Y04S 40/22; Y04S 20/221; Y04S 10/126; Y04S 10/58; Y04S 30/14; Y04S 50/10; Y02E 60/76; Y02E 60/721; H02J 7/0054; H02J 13/0013; H02J 7/0027; H02J 3/008; H02J 2007/0096; H02J 2003/007; Y02T 10/7291; Y02T 90/121; Y02T 90/162; Y02T 10/7088; Y02T 10/705; Y02T 90/163; Y02T 90/169; Y02T 10/7044; Y02T 10/7005; Y02T 90/128; Y02T 90/14; Y02T 90/16

See application file for complete search history.

(56) References Cited

U.S. PATENT DOCUMENTS

| | | | |
|---|---|---|---|
| 7,027,995 B2* | 4/2006 | Kaufman | G06Q 10/0631 705/7.12 |
| 7,157,806 B2 | 1/2007 | Jabaji et al. | |
| 7,256,516 B2 | 8/2007 | Buchanan et al. | |
| 7,580,817 B2 | 8/2009 | Bing | |
| 7,619,319 B1* | 11/2009 | Hunter | B60L 11/1816 290/4 R |
| 7,656,162 B2* | 2/2010 | Vonderhaar | G01R 31/3631 324/426 |
| 7,679,336 B2 | 3/2010 | Gale et al. | |
| 7,693,609 B2 | 4/2010 | Kressner et al. | |
| 7,747,739 B2 | 6/2010 | Bridges et al. | |
| 7,792,613 B2 | 9/2010 | Kressner et al. | |
| 7,840,447 B2 | 11/2010 | Kleinrock et al. | |
| 7,849,944 B2 | 12/2010 | DeVault | |
| 7,979,164 B2 | 7/2011 | Garozzo et al. | |
| 8,006,793 B2 | 8/2011 | Heichal et al. | |
| 8,294,286 B2* | 10/2012 | Hunter | F02D 29/06 290/1 A |
| 9,153,966 B2 | 10/2015 | Ishida | |
| 9,168,841 B2 | 10/2015 | Kawai et al. | |
| 9,209,638 B2 | 12/2015 | Bouman | |
| 9,266,438 B2* | 2/2016 | Power | B60L 11/1809 |
| 9,566,868 B2* | 2/2017 | Jammer | B60L 11/1816 |
| 2002/0132144 A1 | 9/2002 | McArthur et al. | |
| 2002/0188387 A1* | 12/2002 | Woestman | B60L 58/22 701/22 |
| 2004/0110044 A1* | 6/2004 | McArthur | B60L 11/184 429/443 |
| 2004/0130292 A1 | 7/2004 | Buchanan et al. | |
| 2004/0263178 A1 | 12/2004 | Klaus | |
| 2005/0096974 A1 | 5/2005 | Chagoly | |
| 2006/0246436 A1 | 11/2006 | Ohno et al. | |
| 2006/0270454 A1 | 11/2006 | Gotfried et al. | |
| 2009/0030712 A1 | 1/2009 | Bogolea et al. | |
| 2009/0048716 A1 | 2/2009 | Marhoefer | |
| 2009/0200869 A1 | 8/2009 | Fein et al. | |
| 2009/0216387 A1 | 8/2009 | Klein | |
| 2009/0287578 A1 | 11/2009 | Paluszek et al. | |
| 2009/0304101 A1 | 12/2009 | LoPorto et al. | |
| 2010/0010032 A1 | 1/2010 | Fontana et al. | |
| 2010/0017045 A1 | 1/2010 | Nesler et al. | |
| 2010/0141431 A1 | 6/2010 | Boss et al. | |
| 2010/0148726 A1* | 6/2010 | Lee | H02J 7/0016 320/118 |
| 2010/0149968 A1 | 6/2010 | Reinold et al. | |
| 2010/0228415 A1 | 9/2010 | Paul | |
| 2010/0241301 A1 | 9/2010 | Yang | |
| 2011/0022254 A1 | 1/2011 | Johas | |
| 2011/0025267 A1* | 2/2011 | Kamen | B60L 8/003 320/109 |
| 2011/0082598 A1 | 4/2011 | Boretto | |
| 2011/0142055 A1 | 6/2011 | Feder et al. | |
| 2011/0238457 A1* | 9/2011 | Mason | G01C 21/3469 705/7.14 |
| 2011/0238519 A1 | 9/2011 | Basak et al. | |
| 2011/0254504 A1 | 10/2011 | Haddad et al. | |
| 2011/0276194 A1 | 11/2011 | Emalfarb | |
| 2011/0285345 A1 | 11/2011 | Kawai et al. | |
| 2011/0313647 A1 | 12/2011 | Koebler et al. | |

(56) References Cited

U.S. PATENT DOCUMENTS

| | | | |
|---|---|---|---|
| 2012/0005031 A1* | 1/2012 | Jammer | B60L 11/1816 705/16 |
| 2012/0249068 A1 | 10/2012 | Ishida | |
| 2013/0187602 A1 | 7/2013 | Bouman | |
| 2015/0326040 A1 | 11/2015 | Kawai et al. | |

FOREIGN PATENT DOCUMENTS

| | | |
|---|---|---|
| EP | 1 533 373 A1 | 5/2005 |
| EP | 2 518 856 A1 | 10/2012 |
| JP | 2004-000018 A | 1/2004 |
| JP | 2005-168085 A | 6/2005 |
| JP | 2005-210843 A | 8/2005 |
| JP | 2007-164397 A | 6/2007 |
| JP | 2007-252118 A | 9/2007 |
| JP | 2010-115934 A | 5/2010 |
| JP | 2011-107929 A | 6/2011 |
| JP | 2011/128871 A | 6/2011 |
| JP | 2007-535282 A | 11/2011 |
| JP | 2012-005341 A | 1/2012 |
| WO | WO 03/097830 A1 | 11/2003 |
| WO | WO 2008/097031 A1 | 8/2008 |
| WO | WO 2011/077780 A1 | 6/2011 |
| WO | WO 2012/005573 A2 | 1/2012 |
| WO | WO 2012/011436 A1 | 1/2012 |

OTHER PUBLICATIONS

C. Hutson et al., "Intelligent Scheduling of Hybrid and Electric Vehicle Storage Capacity in a Parking Lot for Profit Maximization in Grid Power Transactions," Energy 2008, IEEE Energy 2030 Conference, Nov. 17-18, 2008, 9 pages.

G. K. Venayagamoorthy et al., "Real-time modeling of distributed plug-in vehicles for V2G transactions,". ECCE 2009. IEEE Energy Conversion Congress and Exposition, Sep. 20-24, 2009, pp. 3937-3941.

O. Sundstrom et al. "Planning Electric-Drive Vehicle Charging under Constrained Grid Conditions," 2010 International Conference on Power System Technology (POWERCON), 2010, 6 pages.

M. Moyer, "The Dirty Truth about Plug-in Hybrids," Scientific American, vol. 303, No. 1, Jul. 2010, pp. 54-55.

IPCOM000199937D: "A Taken-based System and Method for Managing a Network of Plugin Hybrid Electric Vehicles" Sep. 21, 2010.

IPCOM000019547D: "Optimization of Vehicle Electrical Architecture, Its Electrical Energy Management and Demand Reduction" Sep. 18, 2003.

IPCOM000183929D: "Mechanism of Electronic Suspension and Suspension Energy Capture" Jun. 5, 2009.

IPCOM000203787D: "Optimized Control of EV (Electric Vehicle) Battery Charging", Feb. 2, 2011.

International Search Report and the Written Opinion dated Apr. 16, 2013.

United States Office Action dated Dec. 5, 2017, in U.S. Appl. No. 15/151,210.

United States Office Action dated May 18, 2018, in U.S. Appl. No. 15/151,210.

United States Office Action dated Sep. 18, 2018, in U.S. Appl. No. 15/151,210.

* cited by examiner

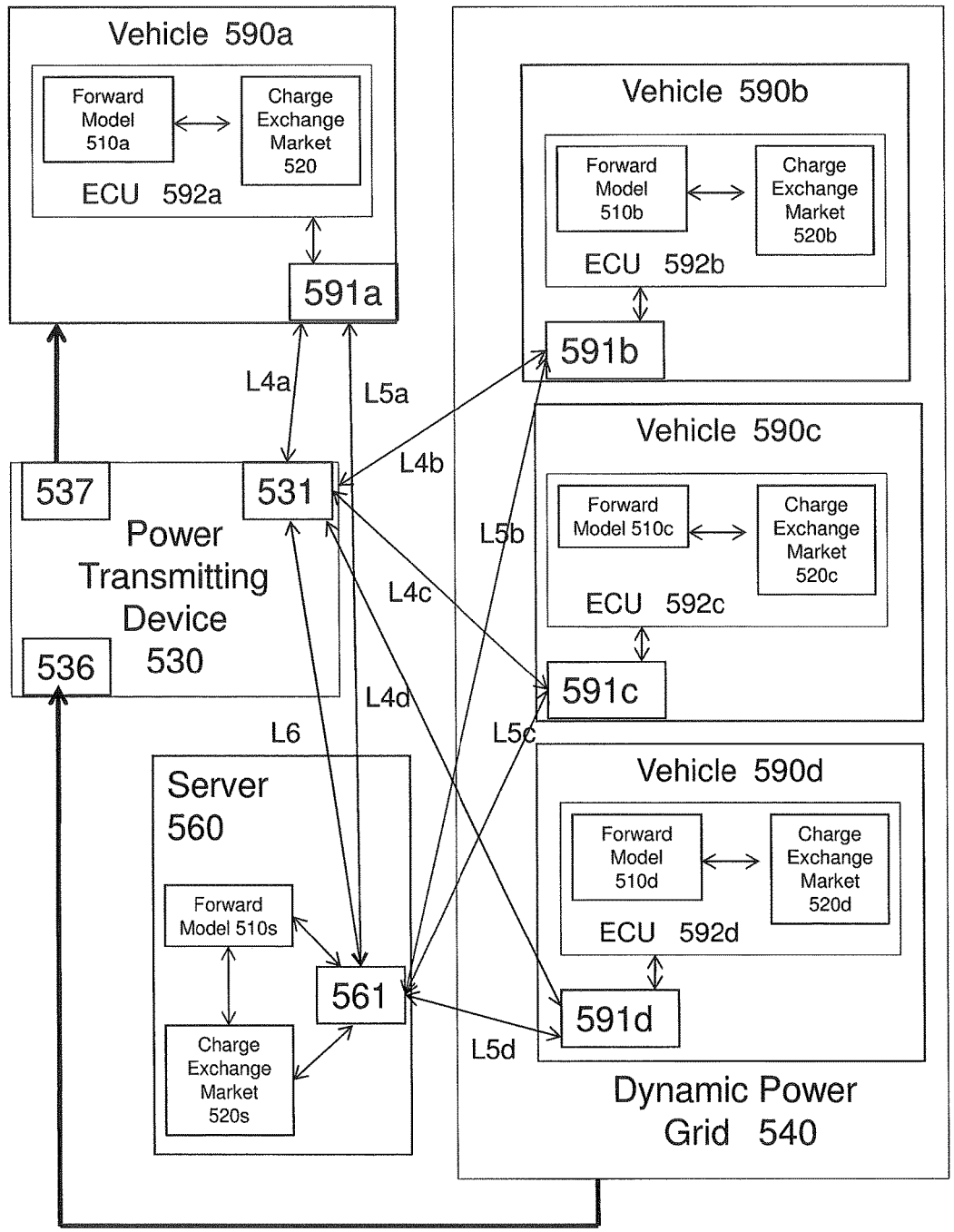
500    Figure 5

| VEHICLE 1 FORWARD MODEL | |
|---|---|
| Current vehicle charge (kWh) | 13.7 |
| Location of vehicle (Lat;Long) | 38.53; -76.22 |
| Destination (Lat;Long) | 40.24; -73.76 |
| Speed (mph) | 62 |
| Rate of power consumption (kWh/mile) | 0.53 |
| Desired time of arrival | 18:30 |
| Maximum desired wait times (minutes) | 30 |
| Current weather conditions | rainy |
| Current traffic conditions | slow |
| Future expected weather conditions | rainy |
| Future expected traffic conditions | slow |
| Future expected location for charging vehicle on standard electric power grid (Lat;Long) | 39.23; -75.44 |

Figure 6     610

| | Charge Exchange Market | | | | | |
|---|---|---|---|---|---|---|
| | Desired Price for Purchase of Spare Charge($/kWh) | Desired Price for Sale of Spare Charge | Desired Charging Time (hrs) | Required Charging Time (hrs) | Desired Final Charging Level (kWh) | Required Final Charging Level (kWh) |
| Vehicle 1 | 0.10 | 0.15 | 5 | 0.15 | 13 | 6.5 |
| Vehicle 2 | 0.12 | 0.20 | 10 | 0.20 | 10 | 8.6 |
| Vehicle 3 | 0.07 | 0.10 | 7 | 0.10 | 15 | 10.3 |
| Vehicle 4 | 0.10 | 0.15 | 5 | 0.15 | 12 | 11.1 |
| Vehicle 5 | 0.15 | 0.20 | 15 | 0.20 | 12 | 7.3 |

SYSTEM AND METHOD OF CHARGING A VEHICLE USING A DYNAMIC POWER GRID, AND SYSTEM AND METHOD OF MANAGING POWER CONSUMPTION IN THE VEHICLE

CROSS-REFERENCE TO RELATED APPLICATIONS

The present application is a Continuation application of U.S. patent application Ser. No. 13/365,834 filed on Feb. 3, 2012, which is incorporated by reference herein and from which the present application claims priority.

BACKGROUND OF THE INVENTION

Field of the Invention

The present invention relates to a system and method of charging a vehicle and a system and method of managing power consumption in a vehicle, and more particularly, a system and method of charging a vehicle using a dynamic power grid and a system and method of managing power consumption in a vehicle which optimizes a plurality of parameters based on a plurality of power source signatures for a plurality of power sources.

Description of the Related Art

Charging a Vehicle

Charging an electric vehicle on a power grid conventionally requires a tradeoff between the power delivery capacity of the grid and the desired charging times of all vehicles charging on the grid.

Batteries in battery electric vehicles (BEVs) must be periodically recharged. Most commonly, these vehicles charge from the power grid (at home or using a street or shop charging station), which is in turn generated from a variety of domestic resources such as coal, hydroelectricity, nuclear and others. Home power such as roof top photovoltaic solar cell panels, microhydro or wind may also be used and are promoted because of concerns regarding global warming.

Charging time is limited primarily by the capacity of the grid connection. A normal household outlet may range from 1.5 kW (in the US, Canada, Japan, and other countries with 110 volt supply) to 3 kW (in countries with 220/240V supply). The main connection to a house might be able to sustain 10 kW, and special wiring can be installed to use this. At this higher power level charging, even a small, 7 kW·h (22-45 km) pack, would generally requires a one hour charge.

In 1995, some charging stations charged BEVs in one hour. In November 1997, a fast-charge system charged lead-acid batteries in between six and fifteen minutes. In February 1998, one system could recharge NiMH batteries in about ten minutes, providing a range of 60 miles to 100 miles (100 km to 160 km). In 2005, mobile device battery designs by one manufacturer were claimed to be able to accept an 80% charge in as little as 60 seconds.

Scaling this specific power characteristic up to the same 7 kW·h EV pack would result in the need for a peak of 340 kW from some source for those 60 seconds. It is not clear that such batteries will work directly in BEVs as heat build-up may make them unsafe.

Today, a conventional battery can be recharged in several minutes, versus hours required for other rechargeable batteries. In particular, a cell in this conventional battery can be charged to around 95% charge capacity in approximately 10 minutes.

The charging power can be connected to the car in two ways using an (electric coupling). The first approach is a direct electrical connection known as conductive coupling. This might be as simple as a mains lead into a weatherproof socket through special high capacity cables with connectors to protect the user from the high voltage. Several standards, such as SAE J1772 and IEC 62196, cohabit.

The second approach is known as inductive charging. A special paddle is inserted into a slot on the car. The paddle is one winding of a transformer, while the other is built into the car. When the paddle is inserted, it completes an electromagnetic circuit which provides power to the battery pack. In one inductive charging system, one winding is attached to the underside of the car, and the other stays on the floor of the garage.

The major advantage of the inductive approach is that there is no possibility of electric shock as there are no exposed conductors, although interlocks, special connectors and RCDs (ground fault detectors) can make conductive coupling nearly as safe. An inductive charging proponent from one manufacturer contended in 1998 that overall cost differences were minimal, while a conductive charging proponent from Ford contended that conductive charging was more cost efficient.

Power Consumption in the Vehicle

A vehicle such as a plug-in hybrid electric vehicle (PHEV) may derive power from two or more on-board power storage systems. The first is a rechargeable battery that can be charged by: 1) the internal-combustion engine, 2) regenerative braking, as in a traditional hybrid vehicle, or 3) connecting a plug to an external electric power grid, a feature unique to PHEV. The second storage system is a traditional fuel tank for the storage of liquid hydrocarbon fuels used to power the internal-combustion engine. Because of the PHEV's capacity to store power from both liquid fuels and the electric power grid, the range of actual energy sources for powering the vehicle is virtually limitless. These sources include, but are not limited to gasoline, ethanol, coal, nuclear, solar, hydro-electric, and wind.

Thus, the electricity used to recharge the battery can come from many sources, depending on the time of day or location of the vehicle. For example, in one region of the country, hydroelectric power may be prevalent. This is a form of "clean" energy. However, in another region of the country, coal may be used. Thus, the recharging of an electric vehicle may be considered relatively "green" (e.g. low carbon creation) or "not green" (e.g. high carbon creation). This means that the same vehicle might be considered to have low environmental impact or high environmental impact.

The impact of each of these power sources on the environment is different, especially with regard to a measure that has grown in importance due to models which predict a human-origin for global warming in the coming decades: the amount of fossil carbon emitted. Thus, PHEV impact varies according to numerous "external" sources Further, the blend of power consumed by a PHEV from either the on-board battery or liquid fuel tank is typically managed by selection of one of several Operating Modes which may include, for example, a charge-depleting mode, a blended mode, a charge-sustaining mode and a mixed mode.

The charge-depleting mode allows a fully charged PHEV to operate exclusively (or depending on the vehicle, almost exclusively, except during hard acceleration) on electric power until its battery state of charge is depleted to a predetermined level, at which time the vehicle's internal combustion engine or fuel cell will be engaged. This period is the vehicle's all-electric range. This is the only mode that a battery electric vehicle can operate in, hence their limited range.

The blended mode is a kind of charge-depleting mode. It is normally employed by vehicles which do not have enough electric power to sustain high speeds without the help of the internal combustion portion of the powertrain. A blended control strategy typically increases the distance from stored grid electricity vis-a-vis the charge-depleting strategy.

The charge-sustaining mode is used by production hybrid vehicles (HEVs) today, and combines the operation of the vehicle's two power sources in such a manner that the vehicle is operating as efficiently as possible without allowing the battery state of charge to move outside a predetermined narrow band. Over the course of a trip in a HEV the state of charge may fluctuate but will have no net change.

The mixed mode describes a trip in which a combination of the above modes are utilized. For example, a PHEV conversion may begin a trip with 5 miles (8 km) of low speed charge-depleting, then get onto a freeway and operate in blended mode for 20 miles (32 km), using 10 miles (16 km) worth of all-electric range at twice the fuel economy. Finally, the driver might exit the freeway and drive for another 5 miles (8 km) without the internal combustion engine until the full 20 miles (32 km) of all-electric range are exhausted. At this point the vehicle can revert back to a charge sustaining mode for another 10 miles (16 km) until the final destination is reached. Such a trip would be considered a mixed mode, as multiple modes are employed in one trip. This contrasts with a charge-depleting trip which would be driven within the limits of a PHEV's all-electric range. Conversely, the portion of a trip which extends beyond the all-electric range of a PHEV would be driven primarily in charge-sustaining mode, as used by a conventional hybrid.

Thus, considering the power sources for charging electric vehicles, some have asked whether electric vehicles really are a better environmental choice. In a recently published article, the author noted that driving 60 miles in a day and charging an electric car in Albany, N.Y. where electric energy is relatively clean, would only result in about 18 lb of carbon dioxide being emitted over the course of the day, whereas a gas powered car that gets 30 miles to the gallon would result in 47 lb over the same 60 miles. However, charging an electric car in Denver, Colo. which is powered by higher levels of coal, would actually emit the same levels of carbon dioxide as the comparable gas powered car.

SUMMARY

In view of the foregoing and other problems, disadvantages, and drawbacks of the aforementioned conventional systems and methods, an exemplary aspect of the present invention is directed to a system and method of charging a vehicle and a system and method of managing power consumption in a vehicle which are more convenient and efficient than conventional methods and systems.

An exemplary aspect of the present invention is directed to a system for charging a vehicle. The system includes a forward model for modeling vehicle charging data for a plurality of vehicles, and a charge exchange market which, based on the forward model, facilitates an agreement for transmitting power to a first vehicle of the plurality of vehicles via a dynamic power grid including a second vehicle of the plurality of vehicles.

Another exemplary aspect of the present invention is directed to a method of charging a vehicle. The method includes providing a forward model for modeling vehicle charging data for a plurality of vehicles, and based on the forward model, facilitating an agreement for transmitting power to a first vehicle of the plurality of vehicles via a dynamic power grid comprising a second vehicle of the plurality of vehicles.

Another exemplary aspect of the present invention is directed to a method of charging a vehicle. The method includes providing a forward model of vehicle power utilization and charging requirements for a plurality of vehicles, the forward model inputting data for setting parameters internal to the forward model, over a network from the plurality vehicles, using a charge exchange market to facilitate an agreement for transmitting power to a first vehicle of the plurality of vehicles via a dynamic power grid comprising a second vehicle of the plurality of vehicles, the market comprising data which is stored on a server which is communicatively coupled to the plurality of vehicles via the network, and transmitting power to the first vehicle via the dynamic power grid according to the agreement. The data for setting parameters internal to the forward model comprises current charge of a vehicle, location of the vehicle, destination of the vehicle, speed of the vehicle, rate of power consumption of the vehicle, desired time of arrival of the vehicle, maximum desired wait times of the vehicle, weather conditions, and traffic conditions.

The network comprises one of a cellular phone network and the Internet, and the server accesses an external database to determine and store future expected weather conditions, future expected traffic conditions, and future expected locations for charging vehicles on a standard electric power grid, and uses data from the plurality of vehicles and data from the external database to parameterize a constrained optimization within the forward model, the optimization determining an optimal location for the plurality of vehicles to congregate and exchange power, the optimization minimizing a stop time for the plurality of vehicles, minimizing deviation from a planned route, and minimizing a probability of running out of charge over all expected vehicle actions until a future expected charging of the plurality of vehicles from the standard electric power grid.

Another exemplary aspect of the present invention is directed to a programmable storage medium tangibly embodying a program of machine-readable instructions executable by a digital processing apparatus to perform a method of charging a vehicle, according to an exemplary aspect of the present invention.

Another exemplary aspect of the present invention is directed to a system for managing power consumption in a vehicle. The system includes an optimizing unit for optimizing a plurality of parameters to determine a power to be consumed by the vehicle based on a plurality of power source signatures for a plurality of power sources, and an operating mode setting unit for setting an operating mode for powering the vehicle based on the determined power.

With its unique and novel features, the present invention provides a system and method of charging a vehicle and a system and method of managing power consumption in a vehicle which are more convenient and efficient than conventional methods and systems.

BRIEF DESCRIPTION OF THE DRAWINGS

The foregoing and other objects, aspects and advantages will be better understood from the following detailed description of the embodiments of the invention with reference to the drawings, in which:

FIG. 5 illustrates a system 500 for charging a vehicle, according to another exemplary aspect of the present invention;

FIG. 6 illustrates a forward model 610 according to an exemplary aspect of the present invention;

FIG. 7 illustrates a charge exchange market 720 (e.g., an ad hoc market), according to an exemplary aspect of the present invention;

DETAILED DESCRIPTION OF THE EXEMPLARY EMBODIMENTS OF THE INVENTION

Figure 1:
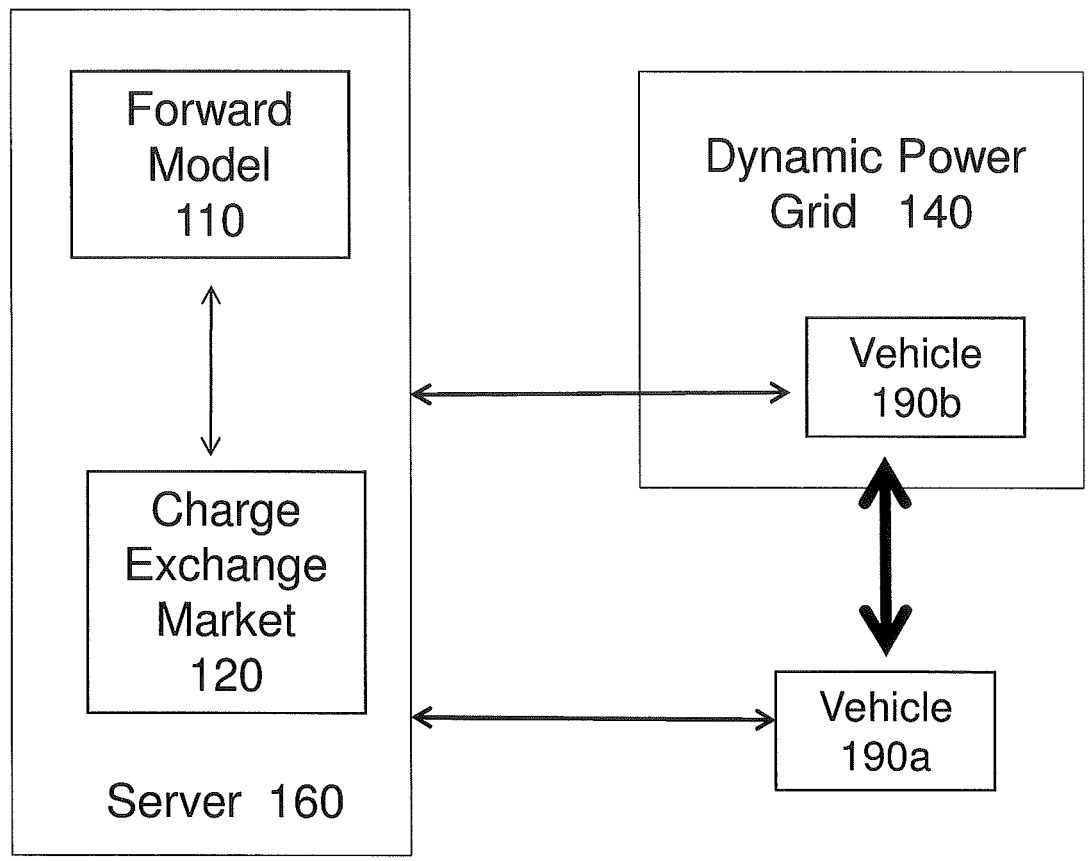
FIG. 1 illustrates a system 100 of charging a vehicle, according to an exemplary aspect of the present invention.

Referring now to the drawings, FIGS. 1-13 illustrate the exemplary aspects of the present invention.

Charging a Vehicle

Conventional systems and methods do not exist to facilitate the formation of "Flash Charge Mobs," in which vehicles congregate to exchange charge. In particular, conventional methods do not facilitate formation of Flash Charge Mobs in which an exchange of charge is optimally based on a forward model of vehicle power utilization, the creation of an ad hoc market for buying and selling spare charging capacity among vehicles underway, and/or a dynamically configured mini-grid for delivering charge between vehicles at a particular voltage and capacity (e.g., amp hours) as determined by the market clearinghouse.

New solutions are needed for at least two reasons. Firstly, it is well-known that electrical grid capacity must be sized to meet peak demands. Shifting demand from peak to non-peak hours thus aids both the utility provider specifically, as well as the general populace more broadly, as electrical grid capacity need not be further expanded to meet heightened peak demands.

Secondly, market triggers to shift demand are increasingly common, with an example being that many utilities charge higher rates during peak hours than during non-peak hours.

Thus, the ability to create dynamic mini-grids between electric vehicles offers vehicle owners an opportunity to arbitrage purchased power, to the benefit of everyone (e.g., buyer, seller, and both standard and mini-grid providers). For example, a user may buy power during non-peak hours at some rate (e.g., 5), and sell it at a higher rate (e.g., 7), which is still less than peak hour market rates (e.g., 9).

Conventional solutions to the problems of the conventional methods may require the user to plug in to the electric grid. Electric grid charging is convenient in some locations, such as homes. However, installing electric grids into some areas, such as large parking structures may be prohibitively expensive. Thus, methods are needed to facilitate charging in such structures or at any location that may potentially contain multiple electric vehicles for an extended duration.

The exemplary aspects of the claimed invention may provide solutions to the problems and drawbacks of conventional systems and methods.

An exemplary aspect of the present invention may include a forward model that takes data from vehicles and vehicle operators over the network in order to set parameters internal to the model. These data may include, charge, location, destination, speed, weather and traffic conditions, etc. and uses it to plan charging opportunities and locations in the future.

The exemplary aspect of the present invention may also include an ad hoc market for the exchange of spare charge between vehicles, established before and/or after the formation of the Flash Charge Mob, and taking inputs from vehicles and their operators.

The exemplary aspect of the present invention may also include a dynamic mini-grid configuration, communicatively coupling the ad hoc market facility (distributed among vehicle's onboard computing facilities) or the remote server of the market clearinghouse to each of the devices responsible for delivering charge from the mini-grid to the vehicle, determining if vehicles deliver charge in a parallel battery configuration or series.

Thus, the exemplary aspect of the present invention may include a forward model, an ad hoc market, and a dynamic mini-grid configuration. The features of the exemplary aspect of the present invention may provide methods for optimally connecting vehicles together into the dynamic (e.g., temporary) mini-grid, in which the ad hoc market allows for vehicles to buy and sell spare charging capacity, and in which a dynamically configured set of electric bus components permits transfer of charge from one or more vehicles to one or more vehicles at a range of voltages and capacities (amp hours) determined by the market.

Referring again to the drawings, FIG. 1 illustrates a system 100 for charging a vehicle according to an exemplary aspect of the present invention.

As illustrated in FIG. 1, the system 100 includes a forward model 110 for modeling vehicle charging data for a plurality of vehicles 190a, 190b, and a charge exchange market 120 which, based on the forward model 110, facilitates an agreement for transmitting power to a first vehicle 190a of the plurality of vehicles via a dynamic power grid 140 including a second vehicle 190b of the plurality of vehicles.

The forward model 110 and the charge exchange market 120 may be wirelessly communicatively coupled to the plurality of vehicles 190a, 190b. In particular, as illustrated in FIG. 1, the forward model 110 and/or the charge exchange market 120 may be stored on a server 160 which is wirelessly communicatively coupled to the plurality of vehicles 190a, 190b. It should be noted that the server 160 may include, for example, a server apparatus (e.g., hardware implemented) or a server module (e.g., software implemented).

Alternatively, any or all of the features and functions of the present invention (e.g., features and functions of the forward model 110 and/or the charge exchange market 120) may be distributed amongst the plurality of vehicles 190a, 190b (e.g., performed by an onboard processor such as the vehicle's electronic control unit (ECU)) which may be communicatively coupled to each other.

Figure 2:
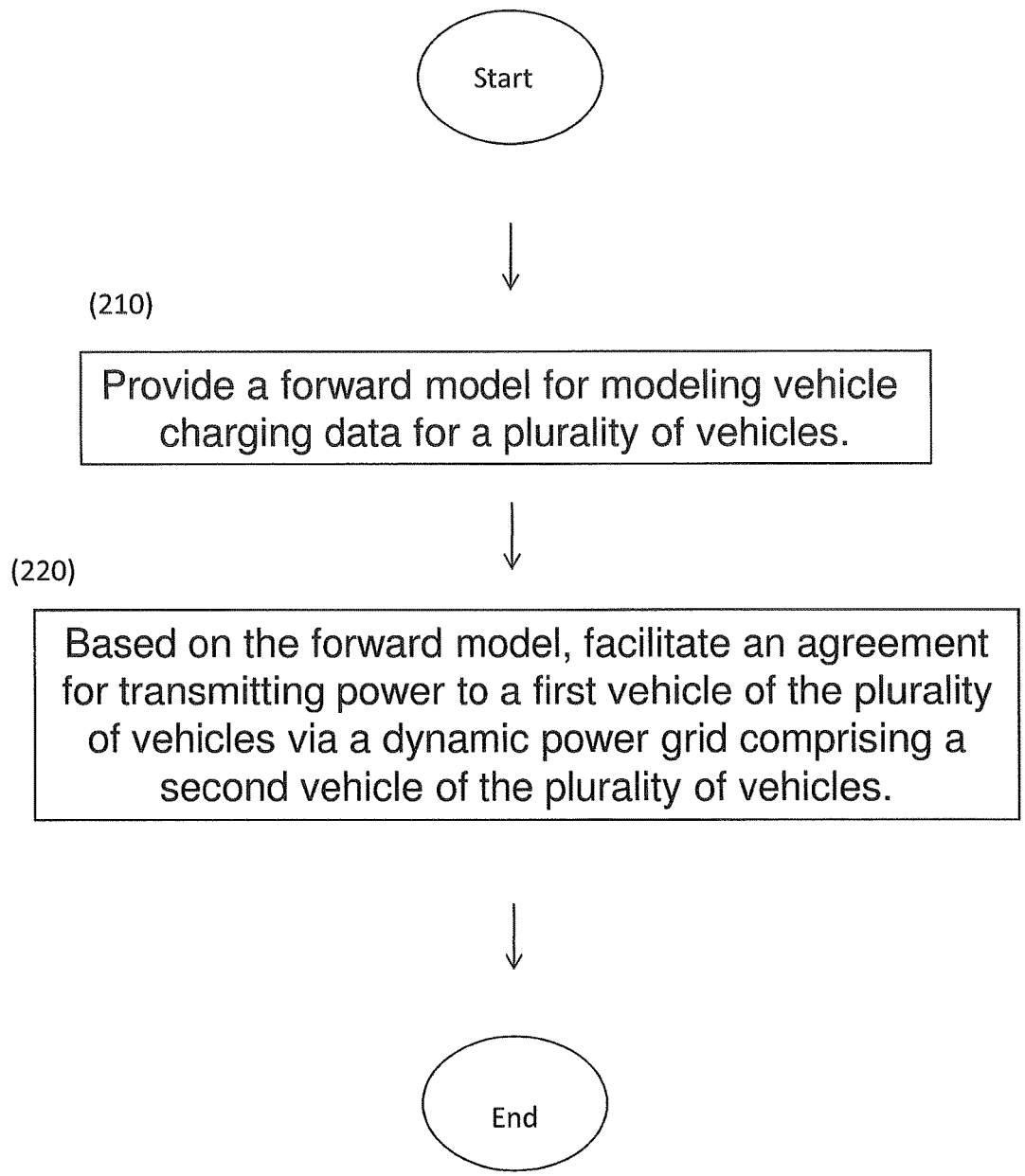
FIG. 2 illustrates a method 200 of charging a vehicle, according to an exemplary aspect of the present invention.

FIG. 2 illustrates a method 200 of charging a vehicle according to an exemplary aspect of the present invention. As illustrated in FIG. 2, the method 200 includes providing (210) a forward model for modeling vehicle charging data for a plurality of vehicles, and based on the forward model, facilitating (220) an agreement for transmitting power to a first vehicle of the plurality of vehicles via a dynamic power grid including a second vehicle of the plurality of vehicles.

It should be noted that the term "power" may be construed to mean "electric charge", "electric current" or "electrical energy" which may be used to recharge an energy storing device (i.e., a device such as a secondary battery which converts stored chemical energy into electrical energy).

Figure 3:
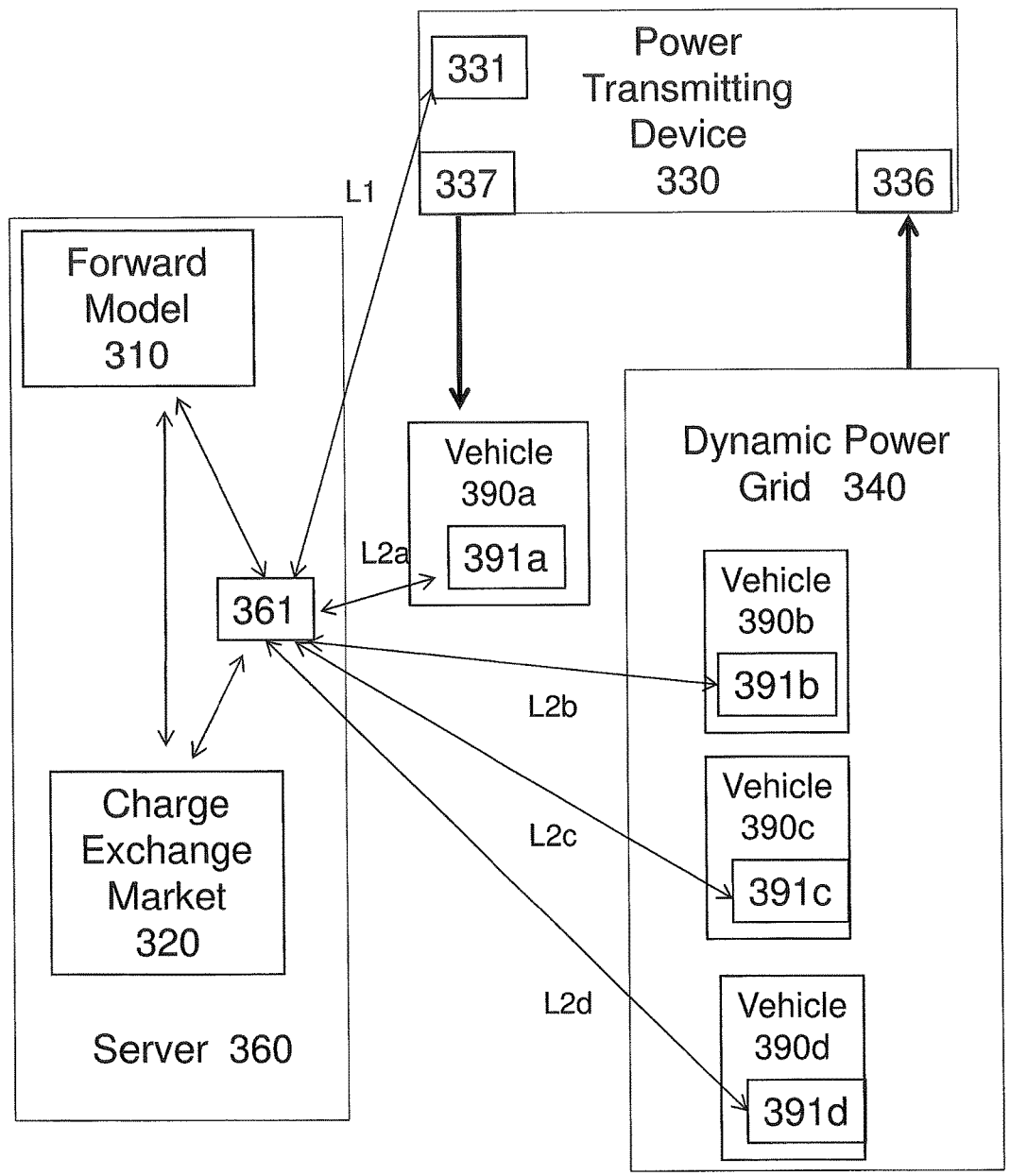
FIG. 3 illustrates a system 300 for charging a vehicle (e.g., transmitting power), according to another exemplary aspect of the present invention.

FIG. 3 illustrates a system 300 for charging a vehicle (e.g., transmitting power), according to another exemplary aspect of the present invention. The system 300 includes a forward model 310 for modeling vehicle charging data for a plurality of vehicles 390a-390d, and a charge exchange market 320 which is associated with the plurality of vehicles 390a-390d (e.g., maintains information on the plurality of vehicles 390a-390d). The market 320 may facilitate an agreement for transmitting power to a first vehicle 390a of the plurality of vehicles via a dynamic power grid 340 including a second vehicle 390b of the plurality of vehicles The system 300 may also include a power transmitting device 330 for transmitting power to the first vehicle 390a via the dynamic power grid 340 according to the agreement.

It should be noted that the charge exchange market 320 may also be associated with other vehicles which are not included in the dynamic power grid 340 in FIG. 3. Further, although the dynamic power grid 340 is illustrated in FIG. 3 as including three vehicles, in fact, the dynamic power grid 340 may include one or more vehicles, and although FIG. 3 illustrates only one vehicle 390a to which power is being transmitted, in fact, power can be transmitted to a plurality of vehicles.

Thus, an exemplary aspect of the present invention may facilitate an exchange of power between vehicles 390a-390d through the dynamic power grid 340 (e.g., an ad hoc mini-grid) that can be managed via the charge exchange market 310 (e.g., via a wireless signal) that may utilize the forward model 310 which may incorporate such considerations as expected weather and traffic. The market 320 may be established dynamically with the power grid 340, and may allow vehicles to buy and sell charge based on parameters (e.g., parameters set by a user or owner of the car).

The dynamics of the market 320 may be published (e.g., via the Internet) to recruit other cars to the power grid 340. Thus, a single vehicle may receive a charge from multiple vehicles connected such that voltage and power delivered is increased and thus charging time decreased.

As illustrated in FIG. 3, the system 300 may also include a server 360 in which case the forward model 310 and/or the charge exchange market 320 may be included in the server 360. In particular, the forward model 310 and charge exchange market 320 may be implemented by a processor in the server, and a memory device (e.g., random access memory (RAM), read-only memory (ROM), etc.) which is accessible by the processor. Some or all of the features and functions of the forward model 310 and/or the charge exchange market 320 may alternatively be implemented as software (e.g., a program of machine-readable instructions for performing a method of charging a vehicle) which is executable by the server 360.

As also illustrated in FIG. 3, the power transmitting device 330 and server 360 may include transceivers 331, 361 (e.g., radio frequency transmitter/receivers), respectively, which may allow the power transmitting device 330 and the server 360 to be communicatively coupled via a communication link (e.g., wireless communication link) L1.

The vehicles 390a-390d may also include transceivers 391a-391d which may allow the vehicles 390a-390d and the server 360 to be communicatively coupled via communication links (e.g., wireless communication links) L2a-L2b, respectively. The transceivers 391a-391d may also be connected to the control devices (e.g., electronic control units (ECUs) in the vehicles 390a-390d, respectively, and may be used to input information (e.g., data for participating in the charge exchange market) to the vehicles 390a-390d and output information from the vehicles 390a-390d.

Although it is not shown (for simplicity), the vehicles 390a-390d may also be communicatively coupled to each other, and may be communicatively coupled to the power transmitting device 330 via a communication link similar to the links L1, L2a-L2b.

The vehicles 390a-390d may include an electric vehicle which is powered by a battery such as a rechargeable lithium ion battery. The vehicles 390a-390d may also include a hybrid vehicle (e.g., plug-in hybrid vehicle) which is powered by a battery, but includes a backup power source (e.g. gasoline-powered engine, hydrogen-powered engine, fuel cell-powered engine, natural gas-powered engine, etc.).

The power transmitting device 330 may include an input port 336 (e.g., a plurality of input ports) for connecting the dynamic power grid (e.g., the vehicles 390b-390d) to the power transmitting device 330, and an output port 337 for connecting the vehicle to be charged (e.g., vehicle 390a) to the power transmitting device 330. The power transmitting device 330 may operate as a conduit so that the vehicle 320 must be connected to the power transmitting device 330 concurrently with the dynamic power grid (e.g., the vehicles 340).

The power transmitting device 330 may also include a power storage capability (e.g., an energy storage device such as a battery) so that the dynamic power grid 340 may transmit power to the power transmitting device 330 which stores the charge (e.g., in a battery) until a later time when the vehicle 390a may connect the power transmitting device 330 to receive the stored charge.

Figure 4:
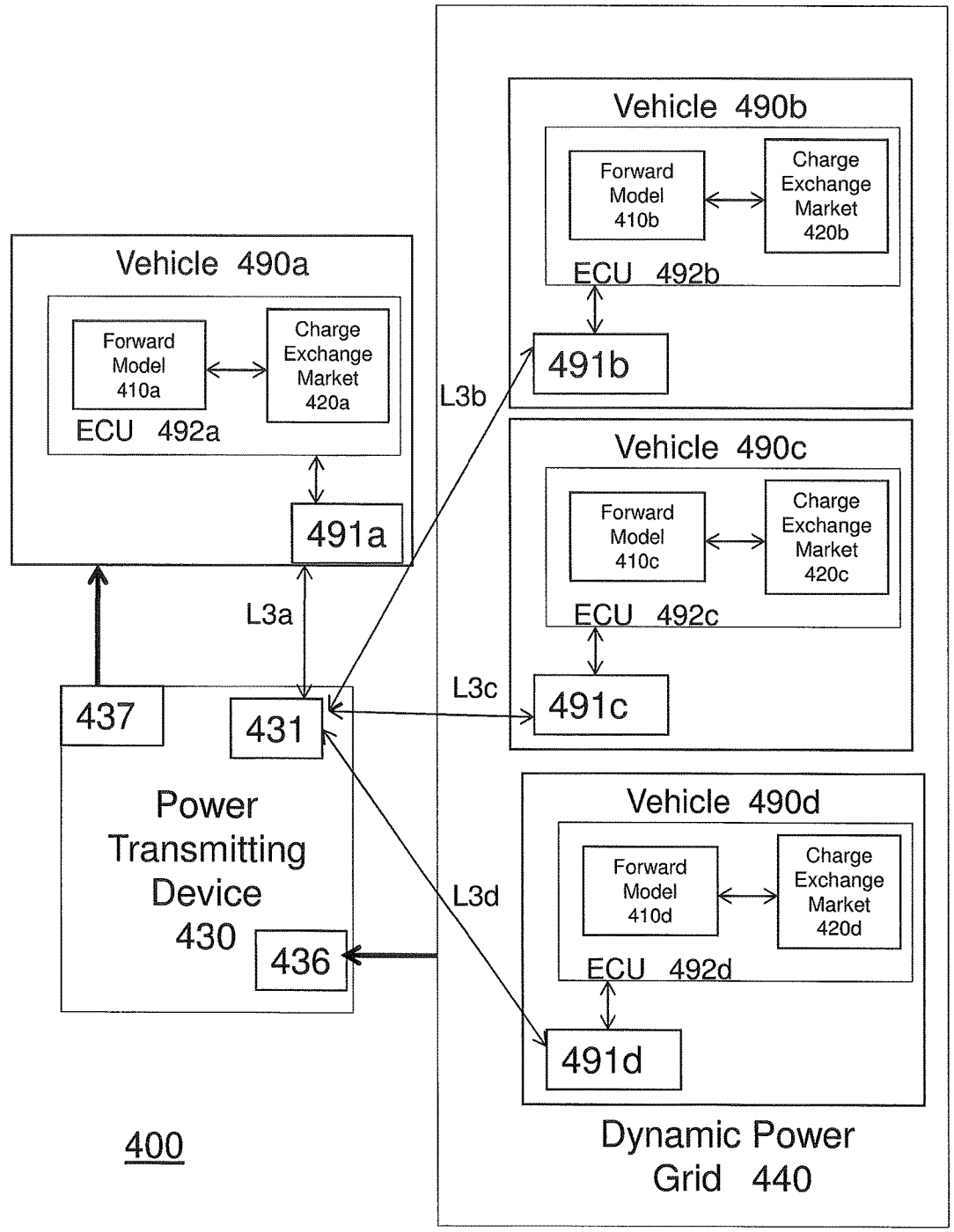
FIG. 4 illustrates a system 400 for charging a vehicle, according to another exemplary aspect of the present invention.

FIG. 4 illustrates a system 400 for charging a vehicle (e.g., transmitting power) according to another exemplary aspect of the present invention. As illustrated in FIG. 4, the system 400 may include the features and functions of system 300.

However, the system 400 does not necessarily include a server (e.g., the server 360), but instead, features and functions of the present invention which are performed by the server 360 in system 300 may be distributed to the plurality of vehicles 490a-490d. In particular, the plurality of vehicles 490a-490d may include a forward model 410a-410d (respectively) and a charge exchange market 420a-420d (respectively) which may include features and functions described above with respect to the forward model 310 and charge exchange market 320.

In particular, the forward model 410a-410d and/or a charge exchange market 420a-420d may be included in a control device such as the electronic control unit (ECU) 492a-492d located in the plurality of vehicles 490a-490d.

Further, the plurality of vehicles 490a-490d may include a transceiver 491a-491d (e.g., a wireless transmitter/receiver), respectively, which is connected to the ECUs 492a-492d (respectively) for allowing the ECUs 492a-492d to wirelessly communicate with each other, and thereby, facilitate an agreement for transmitting power via the power transmitting device 430 from the dynamic power grid 440 (e.g., vehicles 490b-490d) to the vehicle 490a.

Further, the power transmitting device 430 may include transceiver 431, (e.g., radio frequency transmitter/receiver) which may allow the vehicle 490a and the power transmitting device 430 to be communicatively coupled via communication link L3a (e.g., wireless communication link), and allow the vehicles 490b-490d and the power transmitting device 430 to be communicatively coupled via communication link L3b-L3d (e.g., wireless communication link) respectively. Although it is not shown for ease of understanding, the vehicles 490a-490d may also be communicatively coupled to each other via a communication link similar to the links L3a-L3d.

Similar to the power transmitting device 330, the power transmitting device 430 may include an input port 436 (e.g., a plurality of input ports) for connecting the dynamic power grid 440 (e.g., the vehicles 390b-390d) to the power transmitting device 430, and an output port 437 for connecting the vehicle 390a to the power transmitting device 430.

The power transmitting device 430 may operate as a conduit so that the vehicle 490a must be connected to the power transmitting device 430 concurrently with the dynamic power grid (e.g., the vehicles 390b-390d). Alternatively, the power transmitting device 430 may include a power storage capability (e.g., an energy storage device such as a battery) so that the dynamic power grid 440 may transmit power to the power transmitting device 430 which stores the charge (e.g., in a battery) until a later time when the vehicle 390a may connect the power transmitting device 430 to receive the stored charge.

FIG. 5 illustrates a system 500 for charging a vehicle (e.g., transmitting power) according to another exemplary aspect of the present invention.

As illustrated in FIG. 5, the system 500 includes features of both of the systems 300 and 400. That is, similar to the system 300, the system 500 includes a server 560 which includes a forward model 510 and a charge exchange market 520, and a transceiver 561, and similar to the system 400, the vehicles 590a-590d in the system 500 include a control device 592a-592d (e.g., electronic control unit (ECU)) which includes a forward model 510 and a charge exchange market 520.

That is, in the system 500, some features and functions of the forward model 510 and charge exchange market 520 may be included in the server 560, whereas other features and functions of the forward model 510 and the charge exchange market 520 may be included in the control devices (e.g., ECUs 592a-592d) of the vehicles 590a-590d. In particular, some operations of the present invention (e.g., operations which require greater memory or faster processing speed) may be performed in the server 560, but other operations of the present invention may be performed in the control devices of the vehicles 590a-590d.

Further, the plurality of vehicles 590a-590d may include a transceiver 591a-591d (e.g., a wireless transmitter/receiver), respectively, which is connected to the ECUs 592a-592d for allowing the ECUs 592a-592d to wirelessly communicate with each other, and thereby, facilitate an agreement for transmitting power via the power transmitting device 530 from the dynamic power grid 540 to the vehicle 590a.

Further, the power transmitting device 530 may include transceiver 531, (e.g., radio frequency transmitter/receiver) which may allow the vehicle 590a and the power transmitting device 530 to be communicatively coupled via communication link L4a (e.g., wireless communication link), and allow the vehicles 590b-590d and the power transmitting device 530 to be communicatively coupled via communication link L4b-L4d (e.g., wireless communication link). Although it is not shown (for simplicity), the vehicles 590a-590d may also be communicatively coupled to each other via a communication link similar to the links L4a-L4d.

The server 560 may also include transceiver 561, (e.g., radio frequency transmitter/receiver) which may allow the vehicle 420 and the server 560 to be communicatively coupled via communication link L5a (e.g., wireless communication link), allow the vehicles 590b-590d and the server 560 to be communicatively coupled via communication link L5b-L5d (e.g., wireless communication link), and allow the power transmitting device 530 and the server 560 to be communicatively coupled via communication link L6 (e.g., wireless communication link).

Similar to the power transmitting device 330, the power transmitting device 530 may include an input port 536 (e.g., a plurality of input ports) for connecting the dynamic power grid 540 (e.g., the vehicles 590b-590d) to the power transmitting device 530, and an output port 537 for connecting the vehicle 590a to the power transmitting device 530.

Similar to the power transmitting devices 330 and 430, the power transmitting device 530 may operate as a conduit so that the vehicle 590a must be connected to the power transmitting device 530 concurrently with the dynamic power grid (e.g., the vehicles 590b-590d). The power transmitting device 530 may also include a power storage capability (e.g., an energy storage device such as a battery) so that the dynamic power grid 540 may transmit power to the power transmitting device 530 which stores the charge (e.g., in a battery) until a later time when the vehicle 590a may connect the power transmitting device 530 to receive the stored charge.

FIG. 6 illustrates a forward model 610 according to an exemplary aspect of the present invention.

The forward model 610 models vehicle charging data for a plurality of vehicles. The vehicle charging data may include, for example, vehicle power utilization and charging requirements. The forward model 610 may be formed as a table which is stored, for example, in a memory device such as a RAM, ROM, etc.

The forward model 610 may include data which is input by the user (e.g., owner/operator), or to update and/or maintain data, or to change the settings of the forward model 610. For example, a vehicle may include an input device (e.g., keypad) which a user may use to input data into the forward model 610. The vehicle may also include a control device (e.g., ECU) which is wirelessly communicatively coupled to an input device (e.g., graphical user interface (GUI) on a cellular phone) which may allow the user to wirelessly input data into the forward model 610.

The forward model 610 may be maintained, for example, by an external facility (e.g., stored on a server such as server 360 or 560). The facility may include the server 360 (e.g., a set of computer servers) which includes a communication device (e.g., wireless receiver/transmitter) which is wirelessly communicatively coupled to the plurality of vehicles (e.g., vehicles 390a-390d) over a dedicated network (e.g., a cellular phone network) or via the Internet (e.g., via Wi-Fi, broadband, wireless, etc.). The server may also include a processor which may execute instructions for performing an exemplary method of the present invention (e.g., method 200) in order to maintain and update the forward model 610.

The forward model 610 may take data from vehicles and vehicle users (e.g., owner/operators) over the network in order to set parameters internal to the model. These data may include, but are not limited to (1) Current vehicle charge, (2) Location of vehicle, (3) Destination, (4) Speed, (5) Rate of power consumption, (6) Desired time of arrival, (7) Maximum desired wait times, (8) Current weather conditions, (9) Current traffic conditions. In addition, the server may also be wirelessly communicatively coupled to a database (e.g., other servers) which may allow the server to access the database and collect data from the database. Such data may include, for example, 1) map data, 2) Future expected weather conditions, 3) Future expected traffic conditions, and (4) Future expected locations for charging vehicles on the standard electric power grid.

The server may also have a calculating capability in order to estimate values (e.g., future traffic conditions) from the data collected. The server may also have a learning capability which may allow the server to improve the accuracy of the values estimated by the server.

The forward model 610 may use the data from multiple vehicles and multiple other data sources to parameterize a constrained optimization within the forward model 610, in order to determine at various future time points, an optimal location for vehicles to congregate and exchange charge (i.e., future Flash Charge Mob locations). This optimization may aim to minimize vehicle stop times, deviations from planned routes, and probability of running out of charge over all expected vehicle actions (e.g., all actions of the plurality of vehicles 390a-390d) during the period of time between now and the future expected charging of each vehicle from a standard electric power grid.

FIG. 7 illustrates a charge exchange market 720 (e.g., an ad hoc market) according to an exemplary aspect of the present invention. In particular, FIG. 7 illustrates the data which may be stored, maintained and/or updated by the charge exchange market 720.

The charge exchange market 720 may include a market for the exchange of spare charge between vehicles. The market 720 may be established before and/or after the formation of the Flash Charge Mob. The market 720 may take inputs from the vehicles (e.g., vehicles 390a-390d) and their users (e.g., owner/operators) regarding (1) The desired price for sale or purchase of spare charge, (2) Desired and required charging times, and (3) Desired and required final charging levels.

For example, a vehicle may include an input device (e.g., keypad) which a user may use to input data into the market 720, or to update and/or maintain data, or to change the settings of the market 720. The vehicle may also include a control device (e.g., ECU) which is wirelessly communicatively coupled to an input device (e.g., graphical user interface (GUI) on a cellular phone) which may allow the user to wirelessly input data into the market 720.

The market 720 may be established through an external clearinghouse such as the remote facility (e.g., server 360) which is responsible for maintaining the forward model (e.g., forward model 610). In this case, the clearinghouse data may be taken as inputs to the constrained optimization performed to determine optimal locations for Flash Charge Mobs.

Alternatively (or in addition to the communication between the vehicles 390a-390d and the server 360), the market 720 may be established by the vehicles (e.g., vehicles 390a-390d) through communicative couplings between vehicles, by using the vehicles' onboard computing facility (e.g., ECU) and the vehicles' communication device (e.g., wireless transmitter/receiver). In this case, steps in the creation of the market 720 between Vehicle 1 and Vehicle 2 (e.g., vehicle 390a and vehicle 390b) may include, for example:

(1) Vehicle 1 and Vehicle 2 are connected (e.g., wirelessly connected) to the server;

(2) Vehicle 1 transmits a message indicating a charge is required;

(3) Vehicle 2 receives the message;

(4) Vehicle 2 communicates to vehicle 1 the amount of electric charge that Vehicle 2 is willing to give Vehicle 1;

(5) Vehicle 2 communicates to vehicle 1 the duration that vehicle 2 is available;

(6) Vehicle 2 and Vehicle 1 negotiate monetary rates for electrically charging Vehicle 1;

and (7) A secure transaction is performed between vehicle 1 and vehicle 2;

The dynamic power grid (e.g., dynamic power grid 340) may be formed, for example, following the creation of the Flash Charge Mob and negotiation of prices (e.g., negotiation between the user of vehicle 390a and the user of vehicle 390b) for the purchase and sale of charge (e.g., spare charge). The dynamic power grid may include a mini-grid for electric power distribution.

As illustrated in FIG. 1, the dynamic power grid may include an "ad hoc mini-grid" which is established by using a conductive device (e.g., a portable device) for electrically connecting the vehicle which is to be charged (e.g., vehicle 190a) to a vehicle in the dynamic power grid (e.g., vehicle 190b). For example, the vehicles (e.g., vehicles 190a, 190b) may each include a charging port which may be connected to the electrical system of the vehicle and may be used to charge the vehicle, or transfer charge from the vehicle, and the conductive device may include an electric cable (e.g., insulated metal wire) which has an end which is configured to be connected to the charging port of the vehicles (e.g., vehicles 190a, 190b). In particular, the conductive device may be portably included in, detachably connected to or fixedly connected to at least one of the vehicles (e.g., vehicle 190a and/or vehicle 190b).

Alternatively, as illustrated in FIGS. 3-5, system may include a power transmitting device (e.g., dedicated charging bus). The power transmitting device (e.g., power transmitting device 330) may be fixedly or portably located at a location of the Flash Charge Mob. In this case, the dynamic power grid may be established by electrically connecting the vehicles (e.g., vehicles 390a, 390b) to the power transmitting device (e.g., connecting the vehicles to each other via the power transmitting device).

The users of the vehicles (e.g., owner/operators of the vehicles 390a-390d) may negotiate a price for the sale and purchase of charge, and also may negotiate and pay for specific charging times. Thus, a need may arise to modify the voltage and capacity (amp hours) of the dynamic power grid (e.g., mini-grid) at the charging nodes of the dynamic power grid (e.g., at each of the charging nodes). This may be accomplished by communicatively coupling the charge exchange market (e.g., an ad hoc market facility distributed among vehicle's onboard computing facilities, and/or a market which is maintained in a server) to the device (e.g., power transmitting device 330) responsible for delivering charge from the dynamic power grid to the vehicle (e.g., vehicle 390a).

In particular, the power transmitting device may include an input device which allows a user to input various parameters such as desired charging time. Based on those input parameters, the power transmitting device may configure (e.g., automatically configure) itself to deliver charge to the vehicle (e.g., vehicle 390a) from the vehicles in the dynamic power grid (e.g., vehicles 390b-390d) so that the battery configuration of the vehicles in the dynamic power grid are in parallel or in series.

For example, the power transmitting device may connect the batteries of the vehicles in the dynamic power grid (e.g., vehicles 390b-390d) in series, in which case the power transmitting device increases the voltage delivered, while maintaining the same capacity rating (amp hours). Alternatively, the power transmitting device may connect the batteries of the vehicles in the dynamic power grid in parallel, in which case the device increases the capacity (amp hours) of the battery while maintaining the voltage. This allows the charge exchange market (e.g., the ad hoc market or clearinghouse facility) to control the power transmitting device to be configured so as to deliver charge at a particular voltage and charging capacity, as negotiated in the marketplace.

The exemplary aspects of the present invention may provide numerous advantages over conventional systems and methods. In particular, the exemplary aspects of the present invention may 1) not require power infrastructure installation; 2) assist in the social transition to green vehicles (e.g. electric cars), which may otherwise not occur due to the forecasted paucity of electrical recharging stations over the next decade; 3) facilitate the adoption of a fluid economic system with respect to the buying and selling of electrical charge via an information-processing system; 4) allow users to reach destinations, and thus improves quality of lives, in scenarios that would not otherwise be workable due to travel distances involved and lack of traditional charging stations; and 5) provide a mechanism for securely managing the transactions in a current environment of uncertainty, thus allowing the management or risk and business integrity.

The vehicles may include communication devices (e.g., transceivers 391a-391d) which may allow the vehicles 390a-390d to be communicatively coupled to each other, and/or to the server 360, and/or to the power transmitting device 330. These features may allow a vehicle (e.g., vehicles 390b-390d) to wirelessly transmit a signal indicating that the vehicle is available to provide a charge to another vehicle (e.g., vehicle 390a). Thus, for example, the vehicle (e.g., vehicle 390a) may notify another vehicle and/or a central facility such as the charge exchange market which is located on a remote server (e.g., charge exchange market 320) that the vehicle is available for participation in a Flash Charge Mob.

The vehicle (e.g., vehicle 390a) may use the transceiver (e.g., transceiver 391a), in order to wirelessly transmit a signal to the other vehicle (e.g., vehicles 390b-390d) in order to establish a communication interface with the vehicle (e.g., vehicle 390b-390d) and/or the server 330 (e.g., a central facility). Communication between the vehicles may be facilitated through many mediums. In particular, a message may be transmitted using a known messaging technology such as IBM WebSphere Message Broker.

Figure 8:
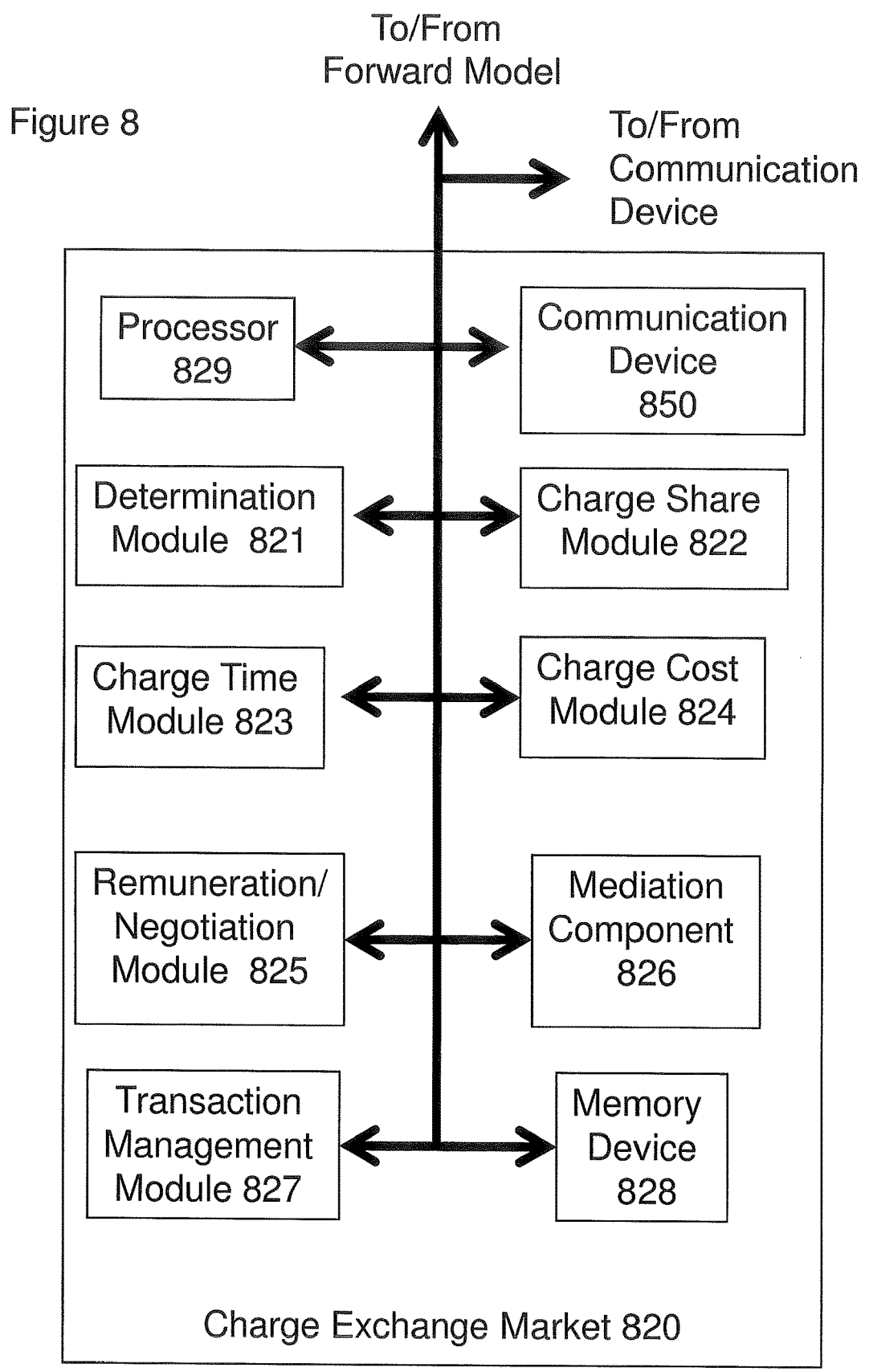
FIG. 8 illustrates a charge exchange market 820 according to an exemplary aspect of the present invention.

FIG. 8 illustrates a charge exchange market 820 according to an exemplary aspect of the present invention. As illustrated in FIG. 8, the charge exchange market 820 is communicatively coupled to the forward model and the communication device (e.g., for communicating with vehicles (e.g., vehicles 390a-390d), the power transmitting device, a network such as the Internet, a wireless cellular network, etc.).

The charge exchange market 820 may be implemented by a processor and a memory which is accessible by the processor (e.g., a microprocessor which accesses a random access memory (RAM), read-only memory (ROM), etc.). Some or all of the features and functions of the charge exchange market 320 may alternatively be implemented as software (e.g., a program of machine-readable instructions for performing the features and functions of the charge exchange market) which is executable by a processing device (e.g., a computer, server, cellular telephone, a vehicle's electronic control unit, etc.).

As illustrated in FIG. 8, the charge exchange market 820 may include a determination module 821, a charge share module 822, a charge time module 823, a charge cost module 824, a remuneration/negotiation module 825, a mediation component 826, and a transaction management module 287.

The determination module 821 may perform an analysis (e.g., a best fit analysis) for matching a vehicle (e.g., vehicles 390b-390d) which may act as a charge provider to the vehicle (e.g., vehicle 390a) which is seeking electric charges. The determination module 821 may also determine an optimal location for a Flash Charge Mob. The determination module 821 may also include a sub-module (e.g., a plurality of sub-modules) having an output which is used by the determination module 821 to find the best fit for charge provider vehicle (e.g., vehicle 390b) and charge seeker (e.g., vehicle 390a).

The charge share module 822 may provide a mechanism for controlling the amount of electric charge that the charge provider vehicle (e.g., vehicle 390b) is willing to transfer to the charge seeker (e.g., vehicle 390a). The amount of electric charge that the charge provider vehicle is willing to give the charge seeker vehicle may be determined based on a plurality of factors. These factors may include, for example, any of 1) a user established threshold (e.g., 60%), 2) charge on the charge provider vehicle and the charge seeker vehicle, 3) the prevailing grid electric rates, 4) the amount that the user (e.g., owner/operator) of the charge seeker vehicle is willing to pay for a charge, 5) the time of day, etc The charge time module 823 is may indicate the duration that the charge provider vehicle is available to charge the charge seeker vehicle. For example, if the charge provider vehicle will not be connected to the power transmitting device long enough to provide the charge required by the charge seeker vehicle, then the charge exchange market may propose that another charge provider vehicle be used to provide transfer a charge to the charge seeker vehicle.

The charge cost module 824 may maintain a desired price for purchasing and selling charge for the vehicles (e.g., vehicles 390a-390d). Individuals may wish to share electrical charge for remuneration because doing so may be profitable for individual sharing a charge. It is common for electric utility providers to charge different prices based on time of day. For example, an electric utility provider may charge 10 cents per kilowatt hour during the day and 5 cents at night.

Therefore, a user who is interested in selling charge to another vehicle may be able to sell that charge to the other vehicle at 7 cents per kilowatt hour during the day and recharge his vehicle during the night time for 5 cents per kilowatt hour, and thus, have a profit of 2 cents per kilowatt hour.

The Remuneration/Negotiation module 825 may include a mechanism for allowing the charge provider vehicle and the charge seeker vehicle to negotiate monetary rates for electrically charging the charge seeker vehicle. For example, the indication, connection, and/or negotiation may be performed automatically through electronic means involving a mediation component, or may be performed through an Internet connection, or may be performed through wireless connections such as a 3G network, or may be performed "Manually" via a web page on the world wide web (e.g., the Internet) that allows users to buy and sell charge.

The mediation component 826 may include a network accessible component that assists in matching charging providers with their charging needs. The mediation component 826 may also assist in determining an acceptable price for a transfer of electric charge. Embodiments may vary, but one particular embodiment includes a web service running on an IBM WebSphere® Application Server.

An embodiment of the mediation component 826 may include configurable parameters for charge parameters. For example, a company employee may have a rate that is lower for another company employee with an efficient car but higher for a stranger with a less efficient car.

The medication component 826 may also include data from multiple parking lots at different geographical locations and route and location information provided by prospective buyers and sellers, and the mediation occurs prior to vehicle selection of and arrival at a parking lot. In this way, markets can grow geographically and allow charge seekers (e.g., charge buyers) and charge providers (e.g., charge sellers) to plan routes and rest stops according to market conditions.

The transaction management module 827 may provide a mechanism for securely managing a transaction between a charge provider vehicle and a charge seeker vehicle. The secure management may include any of, but is not limited to: password protection, badge protection, Internet-based security measures, use of vehicle existing security measures (e.g. involving the vehicle key), etc.

A third party may have access to transaction information generated and/or stored by the transaction management module 827, so that the third party may be able to offer incentives to certain transactions over others. For example, a power company subsidizing certain transactions in order to manage load on existing power grid, may be given access to such transaction information as a third party.

The third party also may have access to buyer and seller information, so that the third party is able to offer incentives to previous charge seekers (e.g., buyers) and charge providers (e.g., sellers) to join certain markets at certain times. This may allow power companies to establish subcontractor relationships with certain charge carrying vehicles in order to position charge at the appropriate locations at the appropriate times.

As illustrated in FIG. 8, the charge exchange market 820 may include a memory device 828 and a processor 829. The memory device 828 may store, maintain and/or update data such as the data illustrated in the charge exchange market 720. The memory device 828 may be accessible by the processor 829 (e.g., a microprocessor which accesses a random access memory (RAM), read-only memory (ROM), etc.). The charge exchange market 820 may also include a communication device 850 (e.g., transceiver) which may communicatively couple the charge exchange market 820 to vehicles, power transmitting devices, servers, other charge exchange markets, etc.

In another exemplary aspect of the present invention, the system (e.g., system 100, 300, 400, 500) may include a vehicle key which is equipped with a cryptography key that can be used to encrypt communication and uniquely identify the key among the plurality of keys produced. When the user (e.g., owner/operator) of the vehicle is seeking a charge, the user may insert the key into a power transmitting device (e.g., a multi-tap bus apparatus), so that the key may be read by the power transmitting device and the user information is transmitted by the power transmitting device to a third party billing source.

The billing source may receive the user information and (in response) transfer funds from the charge seeker to the charge provider. The billing source may also guarantee the payments and transfers between the charge seekers and the charge providers in exchange for a percentage of the transaction.

The system according to an exemplary aspect of the present invention may also include other transaction management features which include but are not limited to 1) direct face to face payment for charge transfer, 2) double-blind service provider billing and monetary transfer, 3) point system in which vendors encourage free donating charges and provides services in return such as roadside assistance, discounts to donors, 4) reputation-based point system in which donations increases a users points and taking charge decreases points (e.g., those with more points and in need of charge may be offered charge before other individuals with lower points).

Electric charge may be transferred from the charge provider vehicle to the charge seeker vehicle by a power transfer mechanism. As noted above, the power transfer mechanism may include a conductive device such as an electric cable (e.g., insulated metal wire) which has an end which is configured to be connected to the charging port of the charge provider vehicle and the charge seeker vehicle. Alternatively, the power transfer mechanism may include a power transmitting device, such as a dedicated charging bus (e.g., a multi-tap bus). The power transfer mechanism may also include some combination of a conductive device and power transmitting device.

Thus, for example, the power transfer mechanism may include any or all of an electrical-bus system present on all the vehicles that are then interconnected for all vehicles wishing to participate, an electrical-bus system in the parking lot that permits more than one vehicle to access the bus, a portable connector carried in the vehicle, a connector that is attached to the vehicle, etc.

The power transfer mechanism may also involve use of an adaptor provided by at least one of the charge provider vehicle and the charge seeker vehicle. The adaptor may be specifically designed to allow the creation of an ad hoc electrical-bus system between the charge provider vehicle and the charge seeker vehicle.

Figure 9:
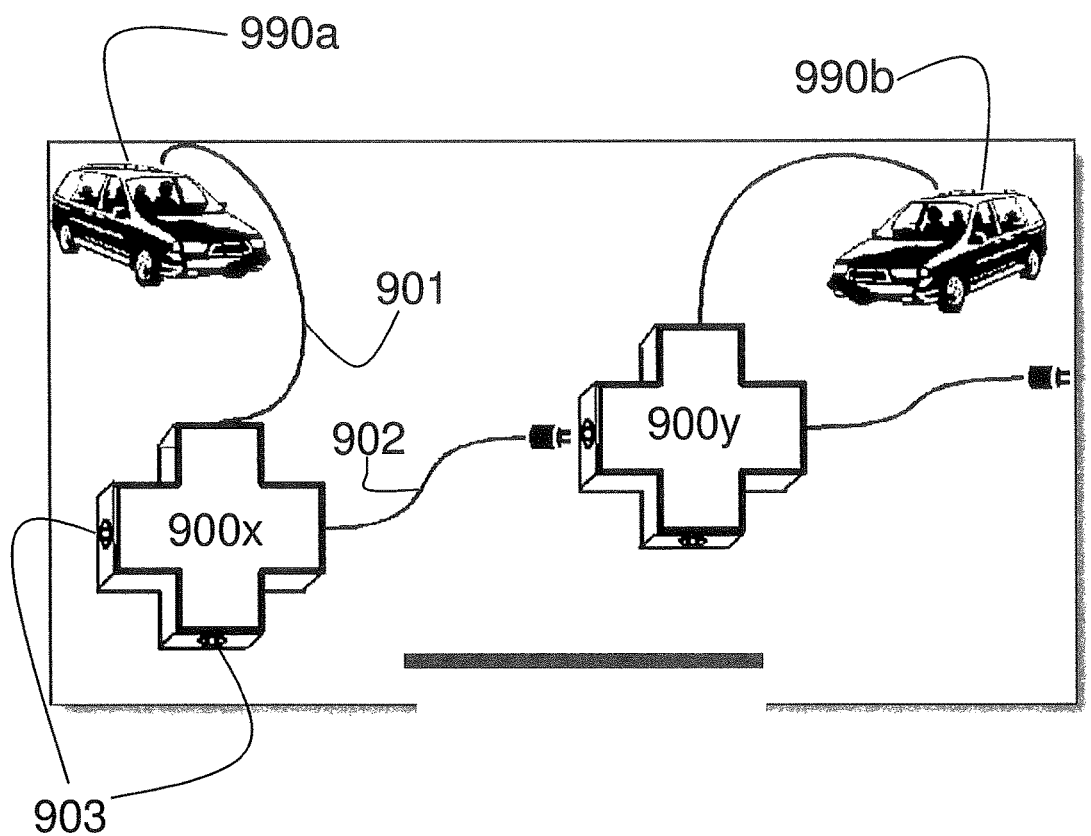
FIG. 9 illustrates a multi-tap bus apparatus 900, according to an exemplary aspect of the present invention.

FIG. 9 illustrates a multi-tap bus apparatus 900, according to an exemplary aspect of the present invention. The multi-tap bus apparatus 900 may serve as the power transfer mechanism in an exemplary aspect of the present invention.

The multi-tap bus apparatus 900 may function in a manner which is similar to a network router. The multi-tap bus apparatus 900 may also include a capability of regulating and conducting electricity through multiple paths for the purpose of transferring electric charge between vehicles. The multi-tap bus apparatus 900 may be part of the vehicle (e.g., fixedly attached to the vehicle, detachable from the vehicle, integrally formed with the vehicle, etc.) or may be stationary and installed, for example, in a parking lot or parking structure.

As illustrated in FIG. 9, the multi-tap bus apparatus 900x may include an insulated electric cable 901 for connecting the apparatus 900 to a charge provider vehicle 990a. The apparatus 900 may also include a cable 902 for connecting the apparatus 900 to another multi-tap apparatus 900y. Alternatively, the cable 902 may be used to connect the apparatus to the charge seeker vehicle 990b. The apparatus 900x may also include a port 903 (e.g., a plurality of ports) for inserting cables in order to transfer charge via the apparatus 900x.

Thus, although FIG. 9 illustrates vehicles 900a, 900b being connected via the multi-tap bus apparatus 900x, 900y which are attached to vehicles 900x, 900y, respectively, the multi-tap bus apparatus 900x may be used to electrically connect the vehicle 900a directly to one or more vehicles.

The multi-tap bus apparatus 900 may also include a communication device 904 such as a wireless communication device (e.g., transceiver). The communication device 904 may provide for a communicative coupling (e.g., via IBM WebSphere Message Broker) to a charge exchange market in a server (e.g., an external clearinghouse) and/or in the vehicles (e.g., an ad hoc market) in order to configure the apparatus 900 to facilitate either series or parallel coupling between charging batteries in order to deliver the negotiated voltage and charge capacity to the purchasing vehicle.

Managing Power Consumption

Figure 10:
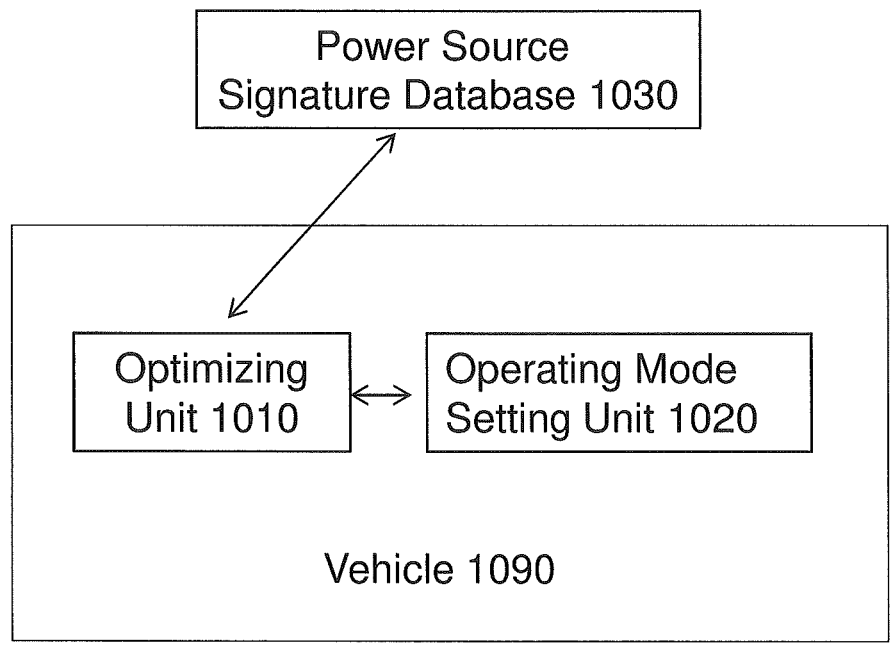
FIG. 10 illustrates a system 1000 of managing power consumption in a vehicle, according to an exemplary aspect of the present invention.

FIG. 10 illustrates a system 1000 for managing power consumption in a vehicle, according to another exemplary aspect of the present invention. As illustrated in FIG. 10, the system 1000 includes an optimizing unit 1010 for optimizing a plurality of parameters (e.g., an environmental impact of a power source, a range of the vehicle, a speed of the vehicle, an acceleration of the vehicle, and a life of a battery in the vehicle) to determine a power to be consumed by the vehicle 190 based on a plurality of power source signatures for a plurality of power sources, and an operating mode setting unit 1020 for setting an operating mode for powering the vehicle based on the determined power.

Figure 11:
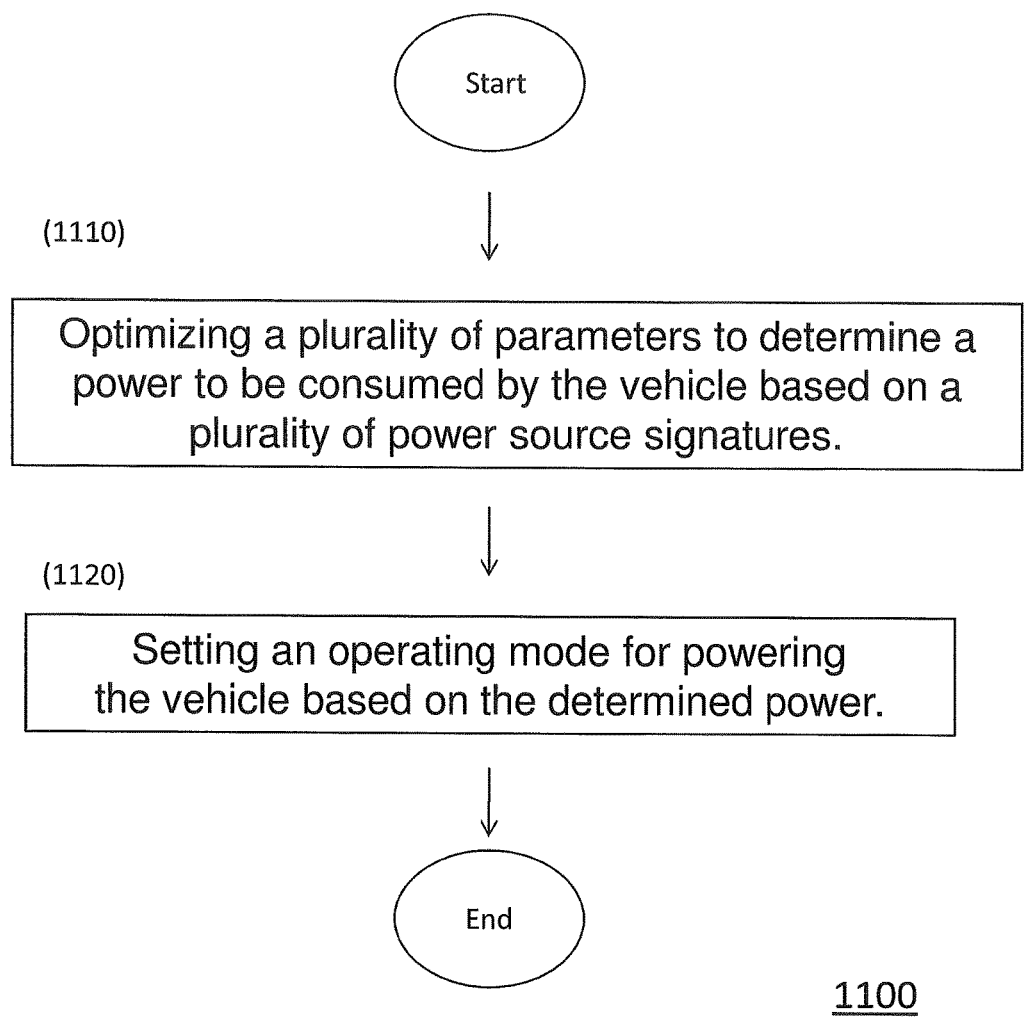
FIG. 11 illustrates a method 1100 of managing power consumption in a vehicle, according to an exemplary aspect of the present invention.

FIG. 11 illustrates a method 1100 of managing power consumption in a vehicle, according to an exemplary aspect of the present invention. As illustrated in FIG. 11, the method 1100 includes optimizing (1110) a plurality of parameters to determine a power to be consumed by the vehicle based on a plurality of power source signatures for a plurality of power sources, and setting (1120) an operating mode for powering the vehicle based on the determined power.

Referring again to FIG. 10, the system 1000 may be included, for example, in the vehicle (e.g., in the electronic control unit of the vehicle). Alternatively, some or all of the features and functions of the system 1000 may be located outside of the vehicle 190 (e.g., in a handheld device such as a cellular telephone of the user (e.g., owner/operator) of the vehicle).

The optimizing unit 1010 may include a modeling unit for dynamic modeling of expected power consumption for the vehicle, expected charging locations, and the plurality of power source signatures, based on a route planner that includes elevation information and a database of charging locations and refueling stations.

As illustrated in FIG. 10, the system 1000 may also include a power source signature database 1030. The database 1030 may be located remotely from the vehicle and stores the plurality of power source signatures. The optimizing unit 1110 may include a wireless communication device for wirelessly communicating with the database.

The system 1000 may also include a fueling/charging unit for one of fueling and charging the vehicle from the plurality of power sources. The system 1000 may also include a power source signature generating unit for generating the plurality of power source signatures, the power source signature generating unit comprising one of a provider of the plurality of power sources, a governmental body, a third party non-governmental organization. The system 1000 may also include a wireless communication device for wirelessly coupling the vehicle with an other vehicle to determine if an exchange of power source signatures between the vehicle and the other vehicle would increase a net optimization for the vehicle and the other vehicle.

Electricity for charging a vehicle (e.g., a battery in an electric vehicle such as a PHEV) may come from many different sources.

An exemplary aspect of the present invention is directed to a system (and method) by which a vehicle (e.g., a PHEV) may manage (e.g., automatically manage) its power consumption in order to affect (e.g., to reduce or to minimize) environmental impact. In particular, the method may manage power consumption based on a database of signatures for each power source used to charge the vehicle's electric battery, and/or liquid fuel (e.g., gasoline). The method according to an exemplary aspect of the present invention (e.g., an optimization method) may be based on a model of expected fuel consumption, future fuel source availability, and/or a system for "swapping" power source signatures with other hybrid-electric vehicles over a network.

The determination and selection of an optimal operating mode for a vehicle is currently performed based on the expected fuel consumption (based on acceleration and speed) and desired operational range of the vehicle, as noted in the above description of operating modes. Additional parameters could include projected route, and changes in elevation during driving. The problem of optimizing the mode of operation based on minimizing environmental impact is significant, especially given the wide variety of power sources a vehicle can utilize.

In addition, the optimal mode of power utilization depends not only on the current use profile of the automobile and expected use based on route and range specifications, but also on the expected future availability of specific power sources (e.g., "green" sources such as solar and wind vs. "non-green" sources such as coal and gasoline). Given that different vehicles can at any given moment have stored in them power from different sources, the exchange of power between vehicles can make this optimization easier or more difficult depending on the constraints imposed by these power storage profiles for different vehicles. Each of these factors makes minimizing environmental impact a difficult problem, requiring a complex optimization across a variety of known and estimated variables.

Compared to conventional methods and systems, the system 1000 according to an exemplary aspect of the present invention may have the advantage of maintaining a dynamic database of power source signatures which is then used to perform an ongoing optimization aimed at minimizing environmental impact and by determining which mode of power source utilization a vehicle should employ at any given moment. Because traditional hybrids derive all of their power from gasoline (or a gasoline/ethanol mixture), there is no need for such an optimization in traditional hybrid operation.

Furthermore, in setting modes for a vehicle, conventional methods and systems only consider power utilization and desired range and speed/acceleration parameters. The system 1000 according to an exemplary aspects of the present invention, on the other hand, may include a system and method for taking these parameters into account and (e.g., at the same time) optimizing for low environmental impact. Further, the system 1000 and method 1100 may includes a novel manner of optimizing environmental impact across a pool of vehicles by allowing the vehicles to exchange power signatures for charge in their batteries through a remote clearinghouse.

In particular, the system 1000 and method 1100 may utilize a database (e.g., Power source signature database 1030) that stores the power source signatures from all charging and refueling events within a vehicle. These events may derive power from a single source (for example from an electric grid deriving 100% of its power from coal burning power plants) or from multiple sources (for example, from an electric power grid deriving 50% of its power from hydro-electric, and 50% of its power from wind generated electricity).

The signatures denote what type of power was stored in the vehicle and the database associated the amount of that power that has been consumed by the optimizing unit 1010. The optimizing unit 1020 may determine what power the vehicle 1090 consumes at any given moment by performing an optimization over several parameters, including environmental impact, range of vehicle, speed, acceleration, and battery life.

Further, the system 1000 may include a plurality of optimizing units 1010 (e.g., in a plurality of vehicles, respectively) which can negotiate in real time through wireless communication networks and determine if an exchange of power source signatures between the vehicles would help achieve a better net optimization for the vehicles than what could be attained by maintaining power source signatures for each of the vehicles in their original state.

The system 1000 may provide multiple advantages over conventional systems and methods, including but not limited to 1) optimizing a mode of power consumption in a vehicle over several parameters including environmental impact; 2) enabling dynamic modeling of a vehicle's expected power consumption, charging locations, and power source signatures based on a route planner that includes elevation information, and a detailed database of charging location and refueling stations, and 3) permitting vehicles to exchange power signatures wirelessly and for optimization to thereby take place collaboratively, across multiple vehicles, such that the net optimization is improved.

It should be noted that the power source signatures may be generated by power source providers (e.g., electrical utilities or petrochemical companies), through governmental bodies, or through third party non-governmental organizations. The signatures may then either be stored at the point of generation to be queried by vehicles, or downloaded and stored locally on the vehicle. Further, associated calculations which will drive power source decisions may be accomplished entirely on the vehicle, or in some embodiments may be accomplished at a remote source, with the resultant heuristics subsequently downloaded to individual vehicles.

A method according to exemplary aspect of the present invention may include, for example, 1) acquiring information on power sources associated with charging stations (wind, coal, etc.) as a function of time; 2) (optional) acquiring information on blend of liquid fuel in the gas tank (gasoline, ethanol, diesel, etc.), 3) modifying (e.g., by the vehicle) quantity of power or charge in the vehicle's battery associated with each source, 4) acquiring route information; 5) creating a recharging plan (e.g. based on expected points of charging and expected power source signatures derived from each charging location); 6) optimizing parameters to minimize environmental impact or/and attain a particular range of travel; and 7) (optional) sending a signal to carbon-offset provider.

The optimizing unit 1010 may include a plurality of components including a source signature component, a charging station source component, a car database component, a route planning component, a recharging planning component, an optimization component, an automatic fuel source selection component, and an accessory modification component.

The source signature component may include a set of power source signatures collected from charging stations to identify the ultimate source of electric power used to charge the vehicle battery (wind, solar, coal, etc.), as well as the blend of liquid fuel in the gas tank (gasoline, ethanol, diesel, etc.). This data may be stored in a relational database, such as IBM DB2. This information may be accessible by other components in the system 1000 to assist various decision making algorithms.

In the charging station source component, the owner of the charging station may provide information describing the origin of power at specific times of day. This information may be derived directly from the power company via dedicated communication links, or stored by the buyer of the power (e.g., the owner of the charging station) in a database that is queried whenever a charge is requested. The database may be stored (e.g., reside on a disk or flash drive) in the charging station, or other locations as mentioned above. Information from this database may be transmitted to the database in the user's car. The transferred information may be stored in a relational database, such as IBM DB2.

The car database component stores the power source signatures and modifies the quantity of power or charge in the vehicle battery associated with each source. The originating sources of electric power are also used and stored when N cars are exchanging electrical power with N other cars. It should be noted that the car database component may be implemented by a relational database, such as IBM DB2.

The route-planning component may be located, for example, in the vehicle (e.g., vehicle 1090), and may include data such as elevation, distance, and speed estimates at various points along the route. The route planning component may be used to plan the route of the vehicle for one or more trips. This component may be part of the vehicle's navigation system (e.g., GPS based navigation system) or may be a separate system.

For example, the user (e.g., owner/operator) of the vehicle may specify a desired destination, or a sequence of destinations. The system 1000 then takes the present location as the starting point and plans its routes based on the destinations entered. In other embodiments, the routes may be planned with the a web based tool and transmitted to the vehicle using known technology.

The recharging planning component may include expected points of charging, and the expected power source signatures derived from each charging location, as determined by a remotely accessed database charging stations and their associated power source signatures. The recharge points may be selected based on the route entered in the route planning component.

The optimization component of the optimizing unit 1010 may take into account route information, current and expected speed and acceleration, current charge and tank level, and expected future recharging/refilling locations and parameters in order to accomplish one or more of the following: (1) Minimize environmental impact (2) Attain a particular range of travel (3) Maintain a particular speed and acceleration within some parameters (e.g. the driver prefers to drive at 50 mph, and the system infers from past driving habits, or the driver enters this information) (4) Maintain the battery in a particular state (either at a particular level of charge or at a particular rate of discharge)

The automatic fuel source selection component may make suggestions to the user as to how to minimize his environmental impact. In some cases, it may be preferable for the driver to use gasoline only, because, for example, an electric charge would be coming from coal. Alternatively, the car may automatically be placed into gasoline-only use in such scenarios.

The accessory modification component may be used to assist the route planning component in instances where unexpected changes occur to the route. This component may automatically adjust a vehicle's accessories to assist a vehicle in getting to the next routed recharging point.

For example, a driver may take a detour from their charted route, and the detour at the current rate of energy expenditure would prevent them from reaching the optimal charging station selected by the route component. However, the accessory modification component may detect this and automatically or via suggestion to the user modifies the various accessories in the car to lower the energy expenditure to assist the user in making it to the optimal recharge point. Accessory modification may include, but is not limited to: reducing the fan speed of for the climate control, raising the climate control temperature, temporarily turning off the climate control, turning off the radio, lowering the interior lights, etc.

The optimizing unit 1010 may also include a communication device for communicatively coupling the system 1000 with a carbon-offset functionality so that the user, charging station owner, or third-party may provide carbon-offsets to offset the power consumption use (and environmental impact) of a vehicle. It should be noted that all vehicle use consumes energy which, depending on energy source, may increase greenhouse gas emissions. Carbon offsetting provides methods to mitigate current or future greenhouse gas emissions through a plurality of methods.

Companies and organizations exist which specialize in carbon offsetting. Such companies and organizations often initiate carbon offsetting operations after people make individual contributions or companies sign contracts to pay for offsetting operations. However, neither of these methods calculates the carbon offset required based on a consideration of a blend of sources used to power a vehicle.

However, the optimizing unit 1010 may include a carbon offset unit (e.g., carbon offset function) that may be used to calculate the offset for specified blend of sources used to power a vehicle. This may enable accurate carbon offsets for vehicles (e.g., PHEVs).

The carbon offset unit may calculate a level of carbon offsetting to be requested from a commercial offset provider for vehicle usage. Additionally, the carbon offset unit may enable a vehicle user to manually participate in carbon-offset computing during vehicle operations. The carbon offset unit may derive offsets that are related to vehicle blend of resource consumption. Such a system may assist in helping users and corporations offset their carbon use or, in some cases, persuade users to favor vehicle use that consume less resources, resulting in a smaller global environmental impact from driving. The carbon offset unit may be implemented by a function that monitors a number of inputs, calculates the carbon offset required to mitigate carbon consumption based on those inputs and transmits this data to a carbon offset provider or bureau.

The carbon offset unit may include a plurality of inputs. For example, for each vehicle blend, a user may specify a percentage of carbon offsetting to apply for each vehicle use. This may enable a user (e.g., owner/operator) to control what percent they mitigate their vehicle carbon consumption. Other embodiments may enable a user to cap their total offset remuneration by hour, day, week, month, or year. The actual offset may be implemented by a commercial carbon offset provider (e.g., a company that plants trees for carbon sequestration or companies that make technological investments intended to reduce emissions).

The carbon offset unit may also determine the carbon offset by who is driving the vehicle. For example, three (3) individuals may be using the vehicle, or the vehicle may be a rental vehicle. One company or individual, who is interested in environmental stewardship, may request greater carbon offset than another company or individual. A unit may automatically increment its carbon offset micropayment value from a signal sent by the transportation device.

For example, most motor vehicles have an internal communications bus from which all operating parameters of the vehicle may be derived including mileage data and fuel tank level. The internal bus may be a Car Area Network (CAN) or the Society of Automotive Engineers SAE J1850 bus. Further, the updating of the carbon offset micropayment value may be done periodically (e.g. every 10 miles) or at certain points (e.g. when the vehicle is at a charging station)

For example, a driver of a vehicle (e.g., a PHEV) is charging the vehicle in city "A" from midnight to 6 AM, a time in which wind power and hydroelectric power is used. The driver's home is equipped with a charging station. The driver starts a trip and anticipates a recharging of a four (4) hour duration in city "B" that burns coal to charge his vehicle. In city B, the driver will be using a public charging station owned by owner O. The optimizing unit 1010 may take this information into account so as to appropriately perform carbon-offsets, provide information on ranges of travel, etc.

Figure 12:
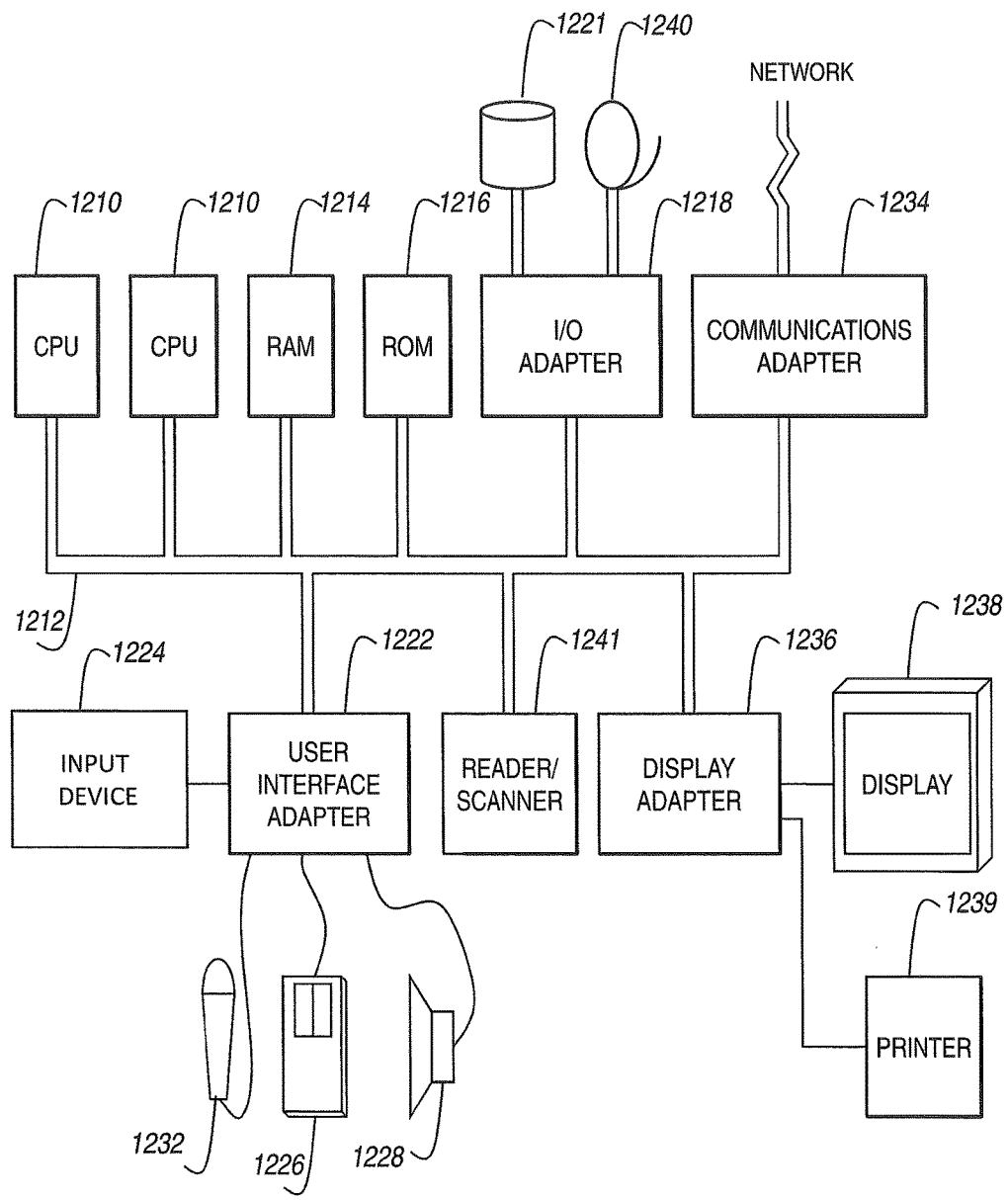
FIG. 12 illustrates a typical hardware configuration 1200 that may be used to implement the system and method (e.g., system 100, 300, 400, 500, 1000, and method 200, 1100), in accordance with an exemplary aspect of the present invention.
Figure 13:
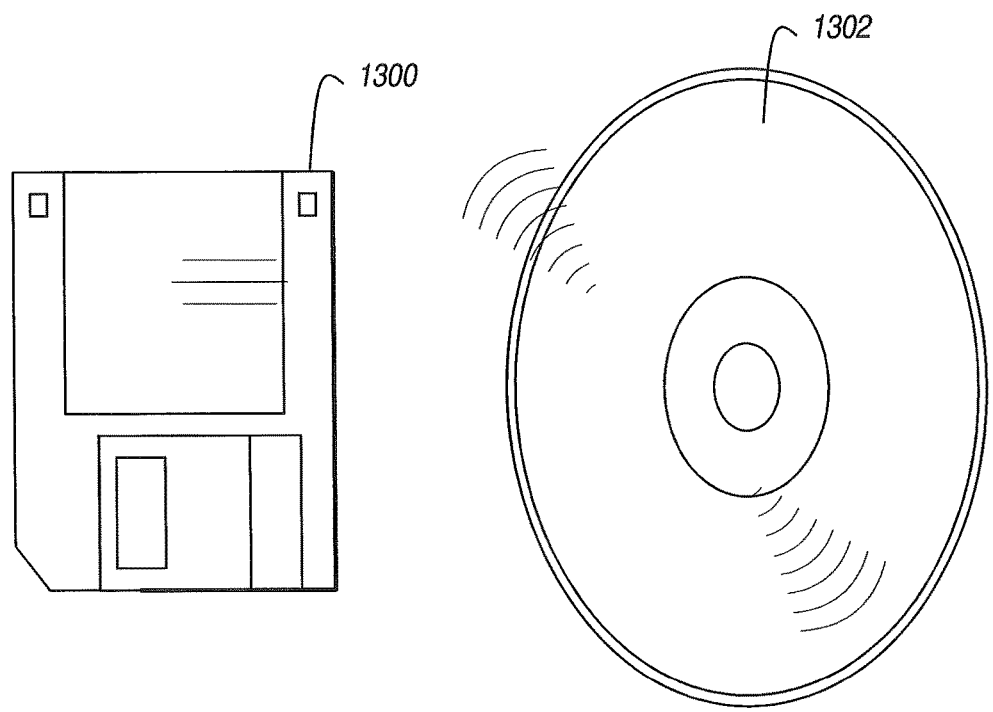
FIG. 13 illustrates a magnetic data storage diskette 1300 and compact disc (CD) 1302 that may be used to store instructions for performing the inventive method of the present invention (e.g., method 200, 1100), in accordance with an exemplary aspect of the present invention.

Referring now to FIG. 12, system 1200 illustrates a typical hardware configuration which may be used for implementing the system (e.g., systems 100, 300, 400, 500, 1000) and method (e.g., method 200, 1100) according to an exemplary aspect of the present invention.

The hardware configuration has preferably at least one processor or central processing unit (CPU) 1210. The CPUs 1210 are interconnected via a system bus 1212 to a random access memory (RAM) 1214, read-only memory (ROM) 1216, input/output (I/O) adapter 1218 (for connecting peripheral devices such as disk units 1221 and tape drives 1240 to the bus 1212), user interface adapter 1222 (for connecting a keyboard 1224, mouse 1228, speaker 1228, microphone 1232, pointing stick 1227 and/or other user interface device to the bus 1212), a communication adapter 1234 for connecting an information handling system to a data processing network, the Internet, an Intranet, an area network (PAN), etc., and a display adapter 1236 for connecting the bus 1212 to a display device 1238 and/or printer 1239. Further, an automated reader/scanner 1241 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 1210 to execute a sequence of machine-readable instructions. These instructions may reside in various types of signal bearing media.

Thus, this aspect of the present invention is directed to a programmed product, including signal-bearing media tangibly embodying a program of machine-readable instructions executable by a digital data processor incorporating the CPU 1210 and hardware above, to perform the method of the invention.

This signal-bearing media may include, for example, a RAM contained within the CPU 1210, as represented by the fast-access storage for example. Alternatively, the instructions may be contained in another signal-bearing media, such as a magnetic data storage diskette 1300 or compact disc 1302 (FIG. 13), directly or indirectly accessible by the CPU 1210.

Whether contained in the computer server/CPU 1210, or elsewhere, the instructions may be stored on a variety of machine-readable data storage media, such as DASD storage (e.g, a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media. In an illustrative embodiment of the invention, the machine-readable instructions may include software object code, compiled from a language such as C, C++, etc.

With its unique and novel features, the present invention provides a system and method of charging a vehicle and a system and method of managing power consumption in a vehicle which are more convenient and efficient than conventional methods and systems.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive method and system is not limited to that disclosed herein but may be modified within the spirit and scope of the present invention.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A system for charging a vehicle, comprising:
a processing device which is communicatively coupled to a plurality of vehicles and maintains a forward model for modeling vehicle charging data for the plurality of vehicles, the processing device using data from the plurality of vehicles to determine an optimal location to exchange charge, the processing device comprising a server which is communicatively coupled to the plurality of vehicles;
a computing device which, based on the forward model, maintains a charge exchange market which directs a formation of a flash charge mob of vehicles from the plurality of vehicles at the optimal location to exchange charge, the flash charge mob comprising a dynamic power grid; and
a power transmitting device for transmitting power from a second vehicle of the plurality of vehicles to a first vehicle of the plurality of vehicles according to an agreement, the charge exchange market being communicatively coupled to the power transmitting device, and controlling the voltage and capacity of the dynamic power grid via the power transmitting device, and the power transmitting device comprising:
an input port for connecting the dynamic power grid; and
a communication device for communicating with the server and the plurality of vehicles,
wherein the plurality of vehicles comprise a plurality of communication devices, respectively, and a user of the first vehicle communicates with a user of the second vehicle which is in the flash charge mob via the plurality of communication devices to facilitate the agreement between the user of the first vehicle and the user of the second vehicle for transmitting power to the first vehicle,
wherein the processing device uses data from the plurality of vehicles and data from an external database to parameterize a constrained optimization within the forward model, and
wherein the optimization minimizes a stop time for the first and second vehicles, minimizes deviation from a planned route, and minimizes a probability of running out of charge over all expected vehicle actions until a future expected charging of the first vehicle from an electric power grid.

2. The system of claim 1, wherein, based on the forward model, the charge exchange market facilitates an agreement for transmitting power to the first vehicle of the plurality of vehicles from the second vehicle of the plurality of vehicles, via the dynamic power grid,
wherein the processing device uses data from the plurality of vehicles to parameterize a constrained optimization within the forward model, the optimization determining an optimal location for the first vehicle to connect to the dynamic power grid for charging the first vehicle, the optimal location comprising a location that is remote from a standard electric power grid charging station, and
wherein the charge exchange market controls a voltage and capacity of the dynamic power grid.

3. The system of claim 2, wherein the processing device comprises a server which is communicatively coupled to the plurality of vehicles via a wireless network, and wherein the forward model inputs data for setting parameters internal to the forward model over the wireless network from the plurality vehicles.

4. The system of claim 3, wherein the data for setting parameters comprises at least one of current charge of a vehicle, location of the vehicle, destination of the vehicle, speed of the vehicle, rate of power consumption of the vehicle, desired time of arrival of the vehicle, maximum desired wait times of the vehicle, weather conditions, and traffic conditions.

5. The system of claim 3, wherein the processing device accesses data which is stored in an external database, the data comprising at least one of future expected weather conditions, future expected traffic conditions, and future expected locations for charging vehicles on a standard electric power grid.

6. The system of claim 2, wherein the plurality of communication devices communicatively couple the first vehicle to the second vehicle, and communicatively couple the first and second vehicles to the processing device,
wherein the plurality of communication devices facilitate a negotiation of terms of the agreement between the first vehicle and the second vehicle.

7. The system of claim 2, further comprising:
a power transmitting device for transmitting power from the second vehicle to the first vehicle according to the agreement; and
a vehicle key which is equipped with a cryptography key that can be used to encrypt communication and uniquely identify the key among a plurality of keys, the key being insertable into the power transmitting device and readable by the power transmitting device, so that user information is transmitted by the power transmitting device to a third party billing source,
wherein the charge exchange market is communicatively coupled to the power transmitting device, and controls the voltage and capacity of the dynamic power grid via the power transmitting device.

8. The system of claim 7, wherein the power transmitting device determines whether the dynamic power grid will deliver charge to the first vehicle in a parallel battery configuration or a series battery configuration.

9. The system of claim 7, wherein the power transmitting device comprises a multi-tap bus, and the charge exchange market is communicatively coupled to the bus and configures the bus to facilitate series or parallel coupling between charging batteries in the dynamic power grid in order to deliver a negotiated voltage and charge capacity from the second vehicle to the first vehicle.

10. The system of claim 2, wherein the vehicle charging data comprises vehicle power utilization data and vehicle charging requirement data.

11. The system of claim 2, wherein the charge exchange market remotely and wirelessly manages the dynamic power grid.

12. The system of claim 2, wherein the second vehicle comprises a plurality of second vehicles, and the charge exchange market manages a purchase of power by the first vehicle from the plurality of second vehicles, and
wherein a voltage and power transmission to the first vehicle is increased with the number of second vehicles in the plurality of second vehicles, and a charging time is decreased with the number of second vehicles in the plurality of second vehicles.

13. The system of claim 2, wherein the charge exchange market receives an input from the vehicles in the flash charge mob, the input including a desired price for sale of power, desired price for purchase of power, desired and required charging times, and desired and required final charging levels.

14. The system of claim 13, wherein the flash charge mob of vehicles is located at a facility comprising a dedicated charging bus, and the transmitting of power comprises transmitting power via the dedicated charging bus.

15. The system of claim 13, wherein the vehicles in the flash charge mob comprise an onboard device for establishing the dynamic power grid, and the transmitting of power comprises transmitting power via the onboard device.

16. The system of claim 1, wherein the computing device comprises an onboard computing device in the plurality of vehicles, and the charge exchange market is formed by the plurality of vehicles by using the onboard computing device.

17. The system of claim 2, wherein the charge exchange market facilitates the agreement by:
transmitting a message from the first vehicle to the second vehicle indicating that the charge is required by the first vehicle;
transmitting a message from the second vehicle to the first vehicle indicating an amount of power that the second vehicle is willing to transmit to the first vehicle, and indicating a duration that the second vehicle is available to transmit the power;
coordinating a negotiation of a monetary rate for the transmitted power between the first vehicle and the second vehicle; and
coordinating a time and place for transmitting the power from the second vehicle to the first vehicle.

18. A method of charging a vehicle, comprising:
in a processing device which is communicatively coupled to a plurality of vehicles, maintaining a forward model for modeling vehicle charging data for the plurality of vehicles, the processing device using data from the plurality of vehicles to determine an optimal location to exchange charge, the processing device comprising a server which is communicatively coupled to the plurality of vehicles;
in a computing device, based on the forward model, maintaining a charge exchange market which directs a formation of a flash charge mob of vehicles from the plurality of vehicles at the optimal location to exchange charge, the flash charge mob comprising a dynamic power grid; and
in a power transmitting device, transmitting power from a second vehicle of the plurality of vehicles to a first vehicle of the plurality of vehicles according to an agreement, the charge exchange market being communicatively coupled to the power transmitting device, and controlling the voltage and capacity of the dynamic power grid via the power transmitting device, and the power transmitting device comprising:
an input port for connecting the dynamic power grid; and
a communication device for communicating with the server and the plurality of vehicles,
wherein the plurality of vehicles comprise a plurality of communication devices, respectively, and a user of the first vehicle communicates with a user of the second vehicle which is in the flash charge mob via the plurality of communication devices to facilitate the agreement between the user of the first vehicle and the user of the second vehicle for transmitting power to the first vehicle,
wherein the processing device uses data from the plurality of vehicles and data from an external database to parameterize a constrained optimization within the forward model, and
wherein the optimization minimizes a stop time for the first and second vehicles, minimizes deviation from a planned route, and minimizes a probability of running out of charge over all expected vehicle actions until a future expected charging of the first vehicle from an electric power grid.

19. A non-transitory programmable storage medium tangibly embodying a program of machine-readable instructions executable by a digital processing apparatus to perform a method of charging a vehicle, the method comprising:

in a processing device which is communicatively coupled to a plurality of vehicles, maintaining a forward model for modeling vehicle charging data for the plurality of vehicles, the processing device using data from the plurality of vehicles to determine an optimal location to exchange charge, the processing device comprising a server which is communicatively coupled to the plurality of vehicles;

in a computing device, based on the forward model, maintaining a charge exchange market which directs a formation of a flash charge mob of vehicles from the plurality of vehicles at the optimal location to exchange charge, the flash charge mob comprising a dynamic power grid; and in a power transmitting device, transmitting power from a second vehicle of the plurality of vehicles to a first vehicle of the plurality of vehicles according to an agreement, the charge exchange market being communicatively coupled to the power transmitting device, and controlling the voltage and capacity of the dynamic power grid via the power transmitting device, and the power transmitting device comprising:

an input port for connecting the dynamic power grid; and a communication device for communicating with the server and the plurality of vehicles, wherein the plurality of vehicles comprise a plurality of communication devices, respectively, and a user of the first vehicle communicates with a user of the second vehicle which is in the flash charge mob via the plurality of communication devices to facilitate the agreement between the user of the first vehicle and the user of the second vehicle for transmitting power to the first vehicle, wherein the processing device uses data from the plurality of vehicles and data from an external database to parameterize a constrained optimization within the forward model, and wherein the optimization minimizes a stop time for the first and second vehicles, minimizes deviation from a planned route, and minimizes a probability of running out of charge over all expected vehicle actions until a future expected charging of the first vehicle from an electric power grid.

* * * * *